US011907260B2

(12) United States Patent
Upton et al.

(10) Patent No.: US 11,907,260 B2
(45) Date of Patent: Feb. 20, 2024

(54) COMPARE PROCESSING USING REPLICATION LOG-INJECTED COMPARE RECORDS IN A REPLICATION ENVIRONMENT

(71) Applicant: INTERNATIONAL BUSINESS MACHINES CORPORATION, Armonk, NY (US)

(72) Inventors: Gregg Andrew Upton, Santa Clara, CA (US); Austin Willoughby, Voorheesville, NY (US); Shinji Satoh, Urayasu (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 16/852,519

(22) Filed: Apr. 19, 2020

(65) Prior Publication Data
US 2021/0326359 A1 Oct. 21, 2021

(51) Int. Cl.
*G06F 16/27* (2019.01)
*G06F 3/06* (2006.01)

(52) U.S. Cl.
CPC .......... *G06F 16/275* (2019.01); *G06F 3/0604* (2013.01); *G06F 3/065* (2013.01); *G06F 3/067* (2013.01)

(58) Field of Classification Search
None
See application file for complete search history.

(56) References Cited

U.S. PATENT DOCUMENTS

| | | |
|---|---|---|
| 7,363,537 B1 | 4/2008 | Svarcas et al. |
| 7,594,138 B2 | 9/2009 | Abdulvahid |
| 7,739,240 B2 | 6/2010 | Saito et al. |
| 7,769,714 B2 | 8/2010 | Lu et al. |

(Continued)

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Joshua Bullock
(74) *Attorney, Agent, or Firm* — Rakesh Roy; Matthew M. Hulihan; Heslin Rothenberg Farley & Mesiti PC

(57) ABSTRACT

Compare processing using replication log-injected compare records includes receiving compare records from a source system having a source datastore in a replication relationship with a target datastore of a target system, the compare records corresponding to selected source objects of the source datastore, and the compare records being received in compare transaction(s) to be performed by the target system for determining whether data of the target datastore is consistent with the selected source objects, and commencing compare processing to perform the compare transaction(s), the compare processing including processing a compare record of the received compare records, which includes identifying a selected source object identified by the compare record, attempting to locate and read a corresponding target object of the target datastore, and further processing the compare record based on whether the corresponding target object is located and read by the attempting.

17 Claims, 21 Drawing Sheets

(56) References Cited

U.S. PATENT DOCUMENTS

| | | | |
|---|---|---|---|
| 7,853,561 | B2 | 12/2010 | Holenstein et al. |
| 8,108,343 | B2 | 1/2012 | Wang et al. |
| 8,126,848 | B2 | 2/2012 | Wagner |
| 8,135,930 | B1* | 3/2012 | Mattox .................. G06F 3/0617 711/100 |
| 9,727,601 | B2 | 8/2017 | Rinke et al. |
| 9,798,792 | B2 | 10/2017 | Laiho et al. |
| 10,013,316 | B2 | 7/2018 | Cadarette et al. |
| 10,229,152 | B2 | 3/2019 | Bourbannais et al. |
| 10,394,485 | B1* | 8/2019 | Chen ...................... G06F 3/061 |
| 10,484,179 | B1* | 11/2019 | Natanzon .............. H04L 9/3236 |
| 10,951,699 | B1* | 3/2021 | Sayles ..................... H04L 69/40 |
| 11,036,677 | B1* | 6/2021 | Grunwald ............... G06F 3/067 |
| 11,120,047 | B1* | 9/2021 | Hoffmann ............. G06F 16/275 |
| 11,789,976 | B2* | 10/2023 | Passey ................. G06F 16/2282 707/611 |
| 2003/0037029 | A1* | 2/2003 | Holenstein .......... G06F 16/2343 |
| 2005/0262097 | A1 | 11/2005 | Sim-Tang et al. |
| 2006/0212465 | A1* | 9/2006 | Fish .................... G06F 11/1662 |
| 2008/0215593 | A1 | 9/2008 | Holt |
| 2010/0114831 | A1 | 5/2010 | Gilbert et al. |
| 2012/0150803 | A1 | 6/2012 | Zhu et al. |
| 2013/0173539 | A1* | 7/2013 | Gilder .................. G06F 16/273 707/610 |
| 2013/0325824 | A1* | 12/2013 | Shoens .................. G06F 16/16 707/698 |
| 2014/0229437 | A1 | 8/2014 | Takeuchi et al. |
| 2015/0278329 | A1* | 10/2015 | Hrle ........................ G06F 16/27 707/615 |
| 2017/0046082 | A1 | 2/2017 | Cadarette et al. |
| 2017/0371914 | A1 | 12/2017 | Bourbonnais et al. |
| 2018/0336105 | A1 | 11/2018 | Cadarette et al. |
| 2019/0163373 | A1* | 5/2019 | Compton ................ G06F 3/065 |
| 2019/0325055 | A1 | 10/2019 | Lee et al. |
| 2019/0332582 | A1 | 10/2019 | Kumar et al. |
| 2021/0026831 | A1 | 1/2021 | Mishra et al. |
| 2021/0117095 | A1* | 4/2021 | Shemer .................. G06F 3/065 |
| 2021/0216502 | A1* | 7/2021 | Subramanian .......... G06F 16/27 |

OTHER PUBLICATIONS

"Developing a conflict exit", IBM | IBM Knowledge Center, retrieved on Apr. 16, 2020 from the Internet URL: <https://www.ibm.com/support/knowledgecenter/SS4T2J_11.3.0/com.ibm.swg.im.iis.clz.imsr.overview.doc/topics/iiyitoiconfexitdev.html>, 4 pgs.

"Format of the data capture log records", IBM | IBM Knowledge Center, retrieved on Apr. 16, 2020 from the Internet URL: <https://www.ibm.com/support/knowledgecenter/SSEPH2_15.1.0/com.ibm.ims15.doc.spr/ims_format_captureddata.htm>, 4 pgs.

"Parameters for conflict exits", IBM | IBM Knowledge Center, retrieved on Apr. 16, 2020 from the Internet URL: <https://www.ibm.com/support/knowledgecenter/SS4T2J_11.3.0/com.ibm.swg.im.iis.clz.imsr.overview.doc/topics/iiyitoiconfexitparms.html>, 12 pgs.

List of IBM Patents or Applications Treated as Related, Apr. 19, 2020, 2 pgs.

"In-Stream Data Load in a Replication Environment", U.S. Appl. No. 16/548,103, filed Aug. 22, 2019, pp. 1-50).

"Log call", IBM Knowledge Center. Retrieved on May 8, 2019 from the Internet URL: <https://www.ibm.com/support/knowledgecenter/en/SSEPH2_13.1.0/com.ibm.ims13.doc.apr/ims_logcall.htm>, 5 pgs.

"LGGF—General Log Format", IBM Knowledge Center. Retrieved on May 8, 2019 from the Internet URL: <https://www.ibm.com/support/knowledgecenter/en/SSGMCP_5.3.0/com.ibm.cics.ts.doc/dfhs4/DFHLGGFK.html>, 8 pgs.

* cited by examiner (Compare UOR contents)

(Apply Process)

COMPARE PROCESSING USING REPLICATION LOG-INJECTED COMPARE RECORDS IN A REPLICATION ENVIRONMENT

BACKGROUND

In both homogenous and heterogeneous replication environments, it may be desired to verify that contents of the target datastore are consistent with contents of the source datastore. A datastore can be a relational database, a hierarchical database system, such as an IBM Information Management System (IMS), offered by International Business Machines Corporation, Armonk, New York, an IBM Virtual Storage Access Method (VSAM) file, a Kafka queue, or a no-SQL database, as examples.

Replication products/software might detect inconsistencies arising from a source object change (or delete) when an attempt is made to apply the change against the target datastore. The target object may not exist, or the current contents may not match the attributes recorded at the source. The replication software could support capabilities that allow these kinds of inconsistencies, sometimes referred to as conflicts, to be resolved when they are encountered. Depending on the particular replication product, the resolution rules could be defined externally (e.g., configuration parameters) or programmatically using what is sometimes termed conflict processing or a "conflict exit".

SUMMARY

Shortcomings of the prior art are overcome and additional advantages are provided through the provision of a computer-implemented method. The method receives, by a target system of a replication environment, compare records from a source system of the replication environment. A source datastore of the source system is in a replication relationship with a target datastore of the target system, in which changes to the source datastore are replicated to the target system for application to the target datastore. The compare records correspond to selected source objects of the source datastore. The compare records are received in one or more compare transactions to be performed by the target system for determining whether data of the target datastore is consistent with the selected source objects. The method also includes commencing compare processing to perform the one or more compare transactions by an apply process of the target system. The compare processing includes processing a compare record of the received compare records. The processing the compare record includes identifying a selected source object identified by the compare record. The compare processing also includes attempting to locate and read a corresponding target object of the target datastore. The compare processing further includes further processing the compare record based on whether the corresponding target object is located and read by the attempting.

Further, a computer system is provided that includes a memory and a processor in communication with the memory, wherein the computer system is configured to perform a method. The method receives, by a target system of a replication environment, compare records from a source system of the replication environment. A source datastore of the source system is in a replication relationship with a target datastore of the target system, in which changes to the source datastore are replicated to the target system for application to the target datastore. The compare records correspond to selected source objects of the source datastore. The compare records are received in one or more compare transactions to be performed by the target system for determining whether data of the target datastore is consistent with the selected source objects. The method also includes commencing compare processing to perform the one or more compare transactions by an apply process of the target system. The compare processing includes processing a compare record of the received compare records. The processing the compare record includes identifying a selected source object identified by the compare record. The compare processing also includes attempting to locate and read a corresponding target object of the target datastore. The compare processing further includes further processing the compare record based on whether the corresponding target object is located and read by the attempting.

Yet further, a computer program product including a computer readable storage medium readable by a processing circuit and storing instructions for execution by the processing circuit is provided for performing a method. The method receives, by a target system of a replication environment, compare records from a source system of the replication environment. A source datastore of the source system is in a replication relationship with a target datastore of the target system, in which changes to the source datastore are replicated to the target system for application to the target datastore. The compare records correspond to selected source objects of the source datastore. The compare records are received in one or more compare transactions to be performed by the target system for determining whether data of the target datastore is consistent with the selected source objects. The method also includes commencing compare processing to perform the one or more compare transactions by an apply process of the target system. The compare processing includes processing a compare record of the received compare records. The processing the compare record includes identifying a selected source object identified by the compare record. The compare processing also includes attempting to locate and read a corresponding target object of the target datastore. The compare processing further includes further processing the compare record based on whether the corresponding target object is located and read by the attempting.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are approaches for detecting and correcting source/target inconsistencies in a replication environment, for instance using source log record injection of comparison records (also referred to herein as "compare records") and target conflict exits to control synchronization.

Users of replication software may prefer to be proactive in detecting inconsistencies between source objects and target objects, and/or determining that none exist. Replication software itself could support a source/target comparison function or, in the case of homogenous replication, creation of back-up copies of the database and comparison to verify consistency. However, comparing the contents of the source/target datastores can be difficult for a variety of reasons, and scale and data in motion make existing solutions difficult or impossible to use.

Replication products could support some form of difference comparison capability which is performed by reading and hashing portions of the source/target datastore and then comparing the results. This can identify whether the data is consistent, but if it is not, the specific inconsistent records cannot be identified.

A secondary approach is to perform this kind of hashing at the record-level or row-level, which allows inconsistencies for a specific record/row to be identified. There may be an option to replace (or refresh) a record/row when an inconsistency is detected. With that approach, generally the source and target datastores need to be placed in read-only mode so that the comparison can be done against static copies of the records/rows.

When considering source/target compares in a homogenous environment, a problem is the time it takes to unload the source/target objects and then perform the compare, which generally requires file transfer since most comparisons are done using a difference detection tool.

Often a datastore is to be set in read-only mode so that a static copy can be obtained. Procedurally, this should be coordinated at both the source and target so that the data is theoretically consistent. Some database systems allow fuzzy copies to be used, which can then be used to create a point-in-time consistent copy of the data that can be used for comparison purposes. A drawback with using real-time copies is the time the data is unavailable to the applications for update purposes and, in both cases, when inconsistencies are detected it is done using potentially stale copies of the data.

Aspects described herein can extend a use of source data injected into a log stream for comparison to target data and provide details about how to resolve inconsistencies that are detected and logic used to detect such inconsistencies.

Figure 1:
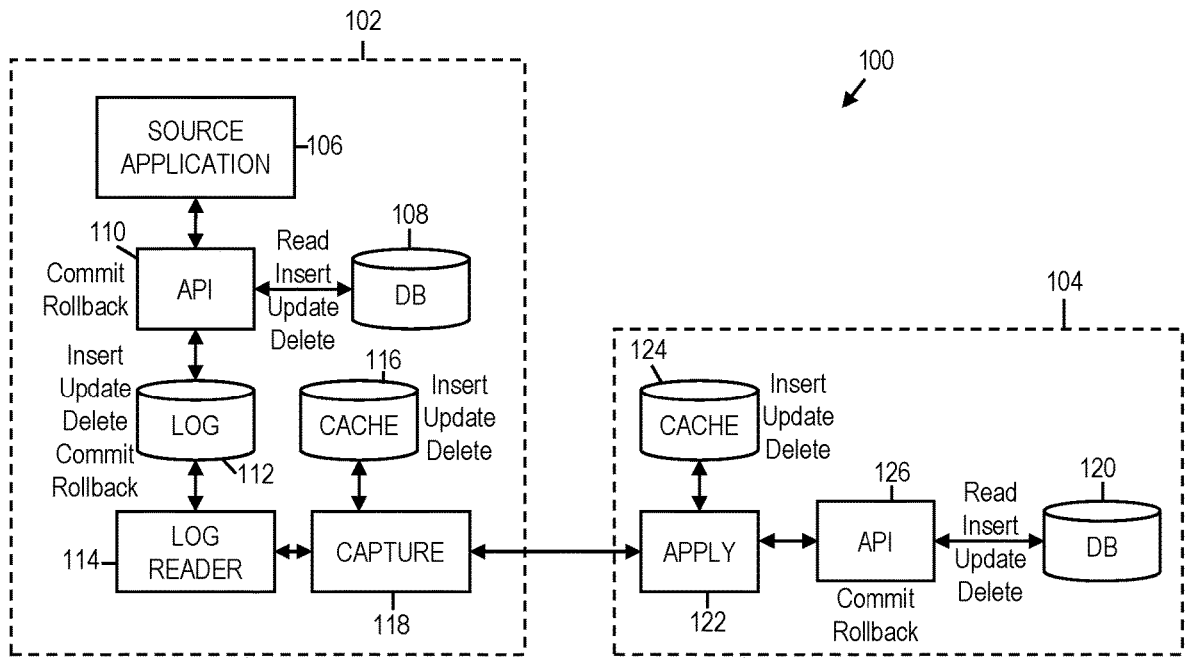
FIG. 1 depicts an example replication environment to incorporate and use aspects described herein.

Most replication solutions use an asynchronous log reading model to capture the changes made to source datastore objects. FIG. 1 depicts an example replication environment to incorporate and use aspects described herein, and specifically is used to provide an overview of a replication solution that uses an asynchronous log reading model to capture the changes made to source datastore objects.

In FIG. 1, replication environment 100 includes a source system (indicated by 102, also referred to as just the "source") and a target system (indicated by 104, also referred to as just the "target") in communication across one or more wired and/or wireless network(s), not depicted. Arrows between two components in FIG. 1 denote wired/wireless communication links across which one or two-way communication between the two components occurs.

In this model, an application 106 that reads/writes objects in a source datastore 108 uses an Application Programming Interface (API) 110 to a database management system (DBMS) that is used to access/update the source datastore 108. The database management system writes changes made to the source datastore objects to a log 112, often for recovery purposes.

The API 110 also supports commit/rollback interfaces that cause the database management system to harden or discard changes made to the source datastore object(s), and also writes data to the log 112 indicating the fate of the transaction.

Replication software (in the form of a log reader 114) executing at the source system reads the contents of the log 112 created by the source datastore database management system and extracts information about the objects being replicated and the transaction semantics. Log records in the log 112 identify changes to objects of interest and are cached in cache 116 until a log record is read that indicates whether the application committed or rolled back the changes. For committed changes, these are sent by capture component 118 to the target system, where they may be applied to a corresponding object in the target datastore 120.

Depending on the implementation, the committed changes may be sent in commit-chronological order and serially applied at the target, or the target may support parallel apply functionality that employs some form of dependency analysis used to ensure the changes are applied in the correct chronological order.

The committed changes are sent by capture component 118 to an apply component 122 executing as part of an apply process. The changes can be cached in cache 124 at the target, allowing a source transaction to be re-applied if a deadlock is encountered.

Also shown in FIG. 1 is a database management API 126 at the target, which is used to locate and access the target object in the target datastore 120, to read the object's current contents, insert new data, update existing data, or delete existing data. For update and delete operations, the source data can be compared against the current contents of the target object to verify that they match.

If the environment 100 of FIG. 1 is a homogenous replication environment, then contents of the source/target objects can be expected to be identical and the source and target API interfaces (110 and 126, respectively) can be provided by a same database management system. In heterogeneous replication environments, the database APIs 110, 126 can be different. The format and contents of the source/target objects may not be the same, but the replication software compensates for the differences so that the target represents an accurate representation of the (potentially sub-set) of data being replicated.

Figure 2:
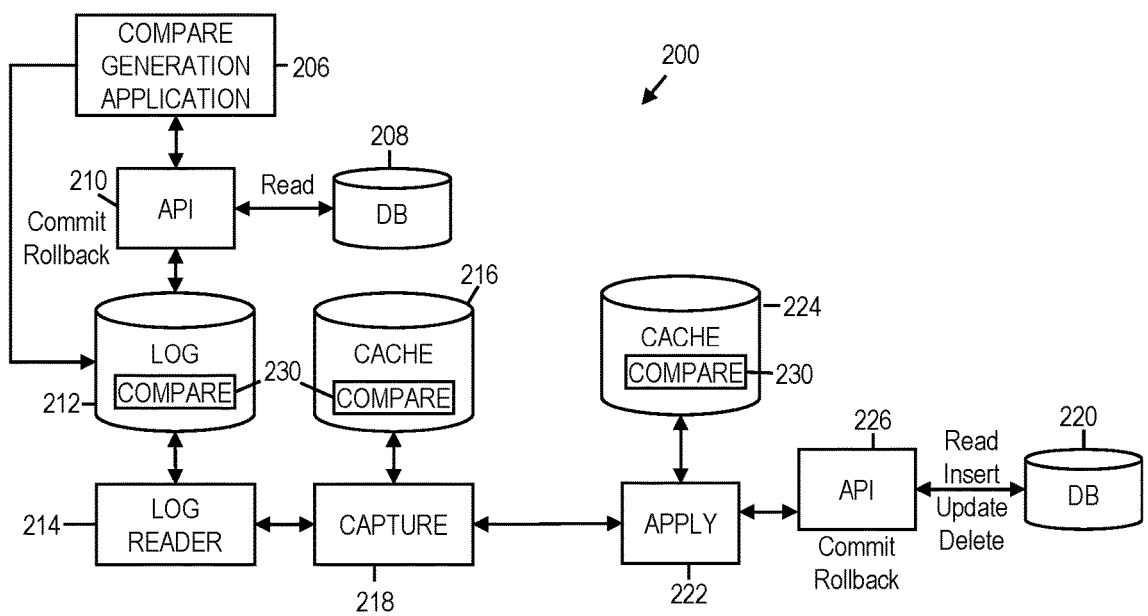
FIG. 2 depicts another example replication environment to incorporate and use aspects described herein.

FIG. 2 depicts another example replication environment to incorporate and use aspects described herein. The replication environment 200 of FIG. 2 depicts aspects of in-stream compare and repair as disclosed herein. Changes relative to the replication environment of FIG. 1 allow more flexibility and reliability in the ability to detect differences between a source datastore object and its target equivalent, if it exists. If a difference is detected, the target can (optionally) be immediately synchronized, which can prevent future conflicts since the data is point-in-time consistent. Other options for conflict handling are also described herein.

In FIG. 2, a compare generation application 206 (also referred to herein as a "compare generation utility"), which can run in addition to or as part of the source application (e.g. 106), uses the database management system's API 210 to read the existing contents of a source datastore object in the source datastore 208 and write a new "compare" record 230 into the replication log 212. The application 206 can read the source object under lock and create a log record containing, as one example, the contents of the source object that the replication solution understands but that does not conflict with or confuse other applications that might process the log 212. The compare records written into the log correspond to some or all source objects of the source datastore. Scoping which source objects are covered by compare processing may be a function of the source log read utility injecting selected records.

Log reader 214, cache 216, capture component 218, apply component 222, cache 224, API 226 and target datastore 220 are largely analogous to their counterparts in FIG. 1, however the replication solution can be modified to detect these new compare records, capture them (capture 218), and stage them as pseudo-transaction(s) ("compare transaction") that flow through the system, indicated by records 230 flowing through the environment 200, akin to a transaction that contains insert, update, and/or delete operations. These "compare" transactions are treated similar to a transaction containing updates insofar as it is to be "applied" in the same chronological order in which the update source workloads are applied.

The target receives compare records from the source system and commences compare processing (e.g. as part of the apply process) to perform the compare transaction(s). The apply process processes the compare UORs in order, and further, within each UOR, processes the compare records in their order within the UOR. This processes compare records in sequence, possibly breaking from processing the UOR, or potentially the whole compare operation depending on conflict(s) encountered and desired handling thereof, as described below.

The apply process of apply component 222 attempts to read for the target datastore object indicated by the compare record and compare the contents of the compare record to see if they match. It does this by identifying a selected source object identified by the compare record and attempting to locate and read a corresponding target object of the target datastore. If inconsistencies are detected, then the replication solution can, in some embodiments, report the inconsistencies by calling a conflict exit that can then direct the apply process to make the target consistent with the source if desired, as one example.

This approach allows for point-in-time source/target comparison at a database record. Assuming the source data is read under lock (it is static at the time of the read) and the comparison transactions are treated as if they updated the source record, then when they are processed at the target the data can be considered point-in-time consistent regardless of how long it takes for one of the comparison transactions to make its way through the system. When the apply process detects discrepancies, a conflict exit can be used to resolve and/or report on the inconsistencies, and the conflict exit can provide more flexibility than providing a configurable set of options.

Processes described herein can be performed while the database is changing, as it may not be desirable (or practical) to establish long term locks so that a consistent comparison can be performed. Neither source nor target applications are materially affected by the compare process and there is no need to quiesce update activity with this solution.

Because an application (the compare generation application) is used to generate the comparison transactions, this solution can provide more options and potentially better performance than existing approaches. An administrator or other user can tailor (or control) the actions of this compare generation application with the ability to select a specific set of records and/or key ranges for comparison.

If the source datastore supports partitioning, then another option that may be provided is the ability to perform parallel comparison operations by running multiple compare generation applications (206) concurrently each restricted to a single partition or set of partitions.

Also provided hereby is a method to detect database records that exist at the target and not the source, and provide a safe method to remove the target database records after verification that these are not false positives. This process can be performed while the source/target databases are being updated, and need not rely on the use of long-term locks that can adversely affect other applications.

Aspects are described and illustrated herein using references to the conflict exit implementation of IBM InfoSphere® IMS Replication for the z/OS® product (offered by International Business Machines Corporation, of which INFOSPHERE and Z/OS are registered trademarks), and using user log records that are akin to those generated by IMS when an IMS database is updated. Such references to this specific implementation are made for purposes of example only; aspects presented herein are applicable to other replication solutions and database types, records, structures, etc., including those that have sub-objects, such as JSON.

IMS Database Record Compare:

IMS is a hierarchical database that includes a root segment, with most typical databases containing multiple child segment types, and most segment types having zero, one, or more than one instance of a specific segment type for each root instance. An IMS segment can have a unique sequence field that can be used to uniquely identify an instance under a parent instance. A sequence field may be optional, and some database organizations can also support sequence fields that do not have to be unique. A root segment need not have a unique sequence field, though practically these situations may not exist on account that records with a duplicate key are generally inaccessible.

Figure 3:
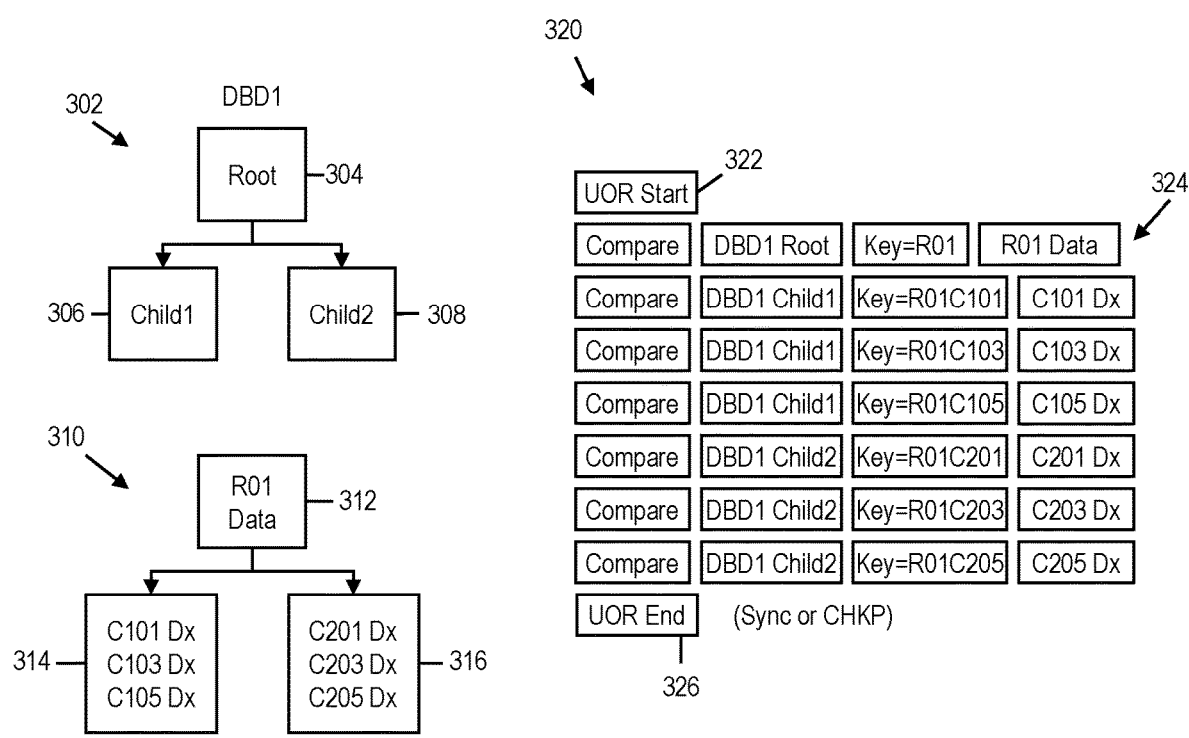
FIG. 3 depicts a representation of a database structure, sample database record, and example records of a corresponding compare transaction, in accordance with aspects described herein.

FIG. 3 depicts a representation of a database structure, sample database record, and example records of a corresponding compare transaction, in accordance with aspects described herein. The example representation in FIG. 3 is of a three-segment database with a two-level hierarchy that uses unique sequence fields for all segments. 302 depicts the database structure (root segment record 304 and child segments 306, 308), while 310 shows sample record contents with a root key of R01 for the root record 312, child instance 314 having three segment instances (C101, C103, C105) each having respective segment data Dx, and child instance 316 with three segment instances (C201, C203, C205) each having respective segment data Dx. DBD1 is the database name in this example, R01 indicates the data record in the database, having a root with data "Data" and child instances/segments under the root, which constitute data of the record.

320 shows an example compare transaction, also referred to herein as a compare or comparison unit of recovery (UOR). A UOR here is indicated by at least a UOR Start record, one or more compare records, and a UOR End record. UOR Start record 322, compare records 324, and UOR End record 326 are produced by the compare generation utility for the R01 database record. The compare records can be stylized and identify information for a database record that includes segments with unique sequence fields (shown as "Key=" values in the compare records 324). A compare record may be created for each segment instance that exists for a root key and each child segment that exists for a specific key value.

For each segment instance, the corresponding compare record can contain, as examples: element(s) that identify the database and segment name to be compared at the target, a concatenated key of the segment to be compared, and a segment data of the segment to be compared.

The compare generation utility can read the contents (or subset) of a source database, generate a separate source UOR for each root key (i.e. each record), and insert a respective compare record into the log for each of the root segment and each child segment that exists for the key in the hierarchical order that exists for that record. Thus, as part of database record verification, it can involve multiple related segments or sub-objects. A hierarchical order is just one example; file systems like databases (such as VSAM), and relational databases (by way of primary keys) provide other examples by which objects can be related. In IMS, relatedness is by way of a root key. For a relational table relation could be by way of the (unique) primary key, for VSAM Key Sequenced Data Set (KSDS) relation could be by way of the key, and for a VSAM Entry-sequenced data set (ESDS) relation could be by way of a Relative Byte Address (RBA), as examples. In particular examples described herein, a selected source object corresponding to a compare record is a first source segment (or other object) of a collection of related source segments of a source data record of the source datastore. The compare record can be a first compare record of a plurality of ordered compare records forming a compare transaction to be performed by the target. The plurality of ordered compare records can be ordered by the source according to an order of the collection of related segments of that source data record of the source datastore by the compare generation utility.

The compare generation utility can signal to the DBMS that a transaction is completed (to cause one or more sync point or checkpoint log records to be written to the log) or may decide to write an application specific "commit" record that indicates the end of the compare transaction for the database key.

The log reader (e.g. 214) can recognize the compare records, capture them, and send them to the capture component (218) to be treated as another source UOR that updates the database. Once the UOR end record (e.g. 326 of FIG. 3) is detected, the compare UOR can be treated as a committed piece of work that is eligible to be sent to the target system in commit-timestamp order.

When the compare UOR is received at the target, the actions indicated by the records can be staged and go through a dependency analysis as would other source UORs (e.g. non compare UORs) received from capture component 218. In this case, there is only one database key referenced by the UOR so it is eligible to be "applied" (processed) after any other source UORs that reference the database key that committed before the compare UOR committed are applied at the target.

The compare records are thereby received in one or more ordered compare transactions (UORs) to be performed by the target system for determining whether data of the target datastore is consistent with the selected source objects. Treating the compare transactions as UORs with dependency ordering ensures sequencing with active database operations that may impact the same keys involved.

Thus, the compare UORs can be treated as other source UORs that contain application database updates are treated, with an assumption being that when a UOR is processed, the database record at the target is expected to match the contents at the source when the compare UOR was inserted into the source log. Two additional aspects of this expectation is that when the source compare UOR was created, there was a read lock on the database record while its contents were read and the compare records inserted into the log, and that the database record at the target is being updated only by the replication software.

The apply process can directly access a target object using information provided by the source for an update or delete operation. When comparing the contents of an IMS database record, the apply process attempts to take a different access strategy which at least initially mimics the process that was used at the source to read the database record and produce the compare records.

For a compare operation, the apply logic would read the root segment and then read the child segments in hierarchical order using a 'get next within parent' option with qualification on the root segment, and compare the data returned from the target with the compare records provided by the compare utility.

Figure 4:
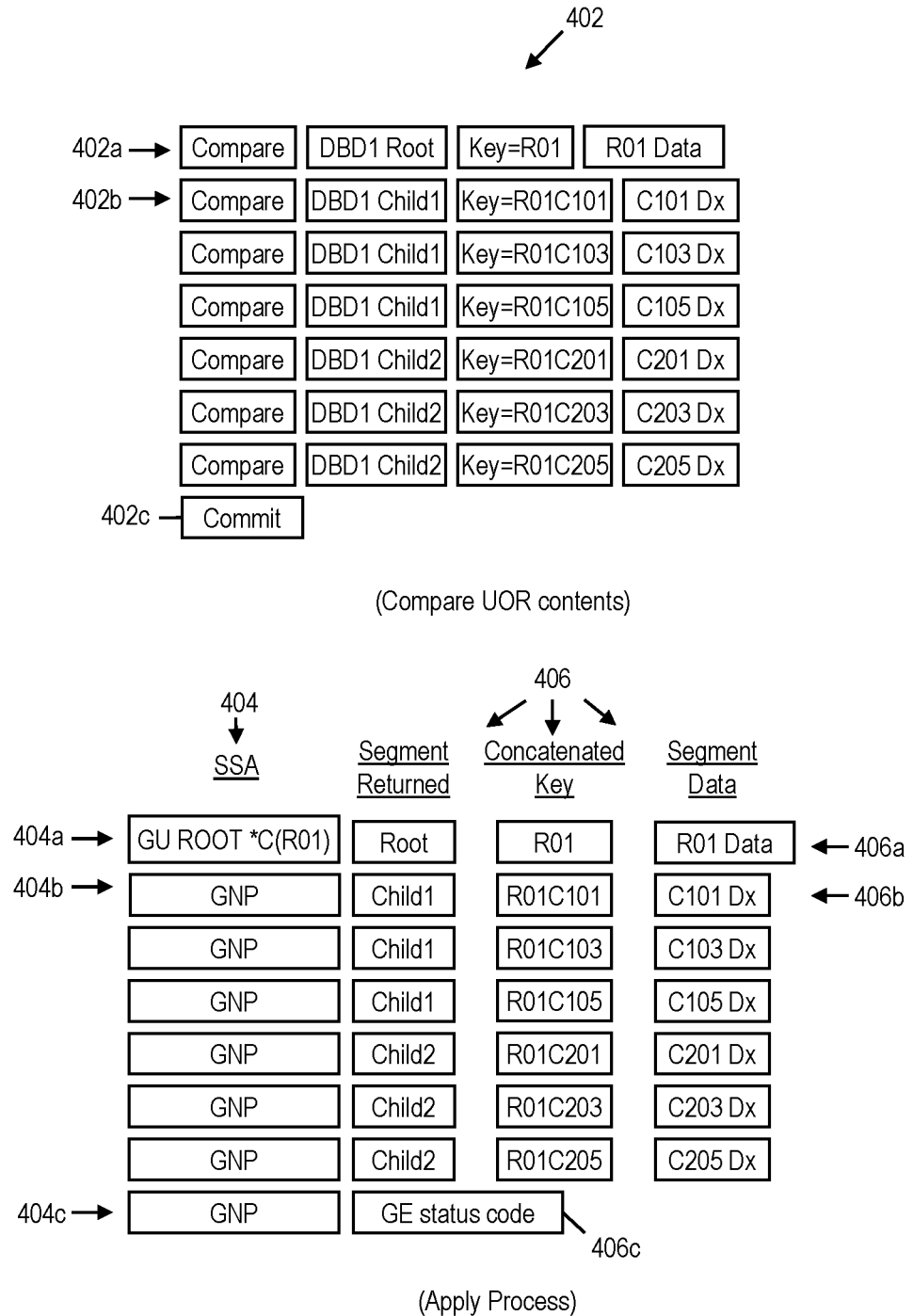
FIG. 4 depicts an example compare transaction and commands issued by an apply process in processing the compare transaction, in accordance with aspects described herein.

These aspects are depicted in FIG. 4, which presents a compare transaction and commands issued by an apply process in processing the compare transaction, in accordance with aspects described herein. 402 depicts contents of a compare UOR, specifically the list of compare records thereof and a commit record 402c. 404 depicts the list of segment search arguments (SSAs), which are commands/ calls that the apply process issues in sequence corresponding to the records in the UOR. The GU SSA is the 'get unique' call and the GNP SSA is the 'get next within parent' call. 406 depicts the list of segment information returned in response to issuing the SSAs. This list identifies the segment returned, a concatenated key for the segment, and segment data of the segment.

The apply process would see, as a first compare record of the UOR 402 in this example, compare record 402a for the root segment. It would (i) read the root from the target by issuing GU ROOT*C(R01) 404a, (ii) finding that it exists, and (iii) then (using segment information 406a) comparing the source image with the target to find that they are the same. The apply process would retrieve the next compare record (402b) and issue a 'get next within parent' (GNP) call 404b and find (via segment information 406b) that what is returned is the same kind of segment (CHILD1) that is identified in the compare record 402b, that it has the same concatenated key (R01C101), and that the segment image retrieved from the target matches the source image in the compare record (C101 has data Dx). This process continues until there are no more compare records in the UOR. The apply process, based on reaching the Commit record 402c, issues one more GNP call 404c, which returns a 'not found condition' 406c, indicating that the source and target contents are consistent for this database record with root key value R01.

Conceptually, a compare UOR is akin to a UOR the contains update or delete operation insofar that as an assumption is the segment instance exists at the target and that its current contents match the before image that existed at the source before the segment was updated or deleted. If one of these assumptions is not correct, then a conflict is detected and, in this embodiment, a programmatic conflict exit can be called. The conflict exit can specify what action the replication software is to take in order to handle (for instance resolve, or provide some other handling of) the conflict. A conflict exit interface of a replication system can thereby be extended to support conflicts detected during a comparison operation.

Example parameters of conflict exits include (but are not limited to) Function Code, Conflict Type, and Return Code. An example list of Function Codes that may be supported is: CFEX_FUNC_THREAD_INIT, CFEX_FUNC_DELETE, CFEX_FUNC_INSERT, CFEX_FUNC_UPDATE, CFEX_FUNC_THREAD_TERM, and CFEX_FUNC_COMPARE.

An example list of Conflict Types that may be supported is:
CFEX_CONFLICT_DUPLICATE, CFEX_CONFLICT_NOTFOUND,
CFEX_CONFLICT_BEFORE_IMAGE, CFEX_CONFLICT_STATUS_CODE, and
CFEX_CONFLICT_TARGET_DATA.

An example list of Return Codes (e.g. indicating actions to take) that may be supported is: CFEX_DEFAULT, CFEX_IGNORE_OPERATION, CFEX_APPLY, CFEX_STOP_REPLICATION, CFEX_STOP_COMPARE, CFEX_STOP_AND_REPLACE_RECORD, CFEX_REPLACE_BUT_CONTINUE, and CFEX_SYNCRONIZE.

A Function Code identifies the operation that was being performed when the conflict was detected. CFEX_FUNC_THREAD_INIT is a thread initialization function and CFEX_FUNC_THREAD_TERM is a thread termination function. CFEX_FUNC_DELETE, CFEX_FUNC_INSERT, and CFEX_FUNC_UPDATE correspond to processing a delete, an insert, and an update request, respectively, and CFEX_FUNC_COMPARE corresponds to a function in accordance with aspects described herein that identifies that the conflict was detected during a compare operation.

Conflict Type identifies what kind of conflict was detected. Functions can report when an insert operation failed because of the following, as examples:
the data identified by the compare record already exists at the target (CFEX_CONFLICT_DUPLICATE);
the data indicated by the compare record is expected to exist at the target but does not (CFEX_CONFLICT_NOTFOUND);
the data identified by the compare record exists but does not match the source data (CFEX_CONFLICT_BEFORE_IMAGE), for instance the segment data does not match. Mismatch in this context means either they both have data but it does not match, or there is no data in target segment. The compare processing either found (i) the sequence (key) value or (ii) a segment that should match based on the sequence of children, but the data is not the same; and/or
a special IMS conflict type indicates an unexpected IMS status code was returned (CFEX_CONFLICT_STATUS_CODE).

For comparison UORs, a conflict type (CFEX_CONFLICT_TARGET_DATA) is added in accordance with aspects described herein for the case where there is data that exists at the target that does not exist at the source. In other words, a next retrieved segment or other object of the target datastore is not present in the source datastore.

The return code identifies the decision the conflict exit has made about how to handle the conflict. Options include to: ignore the conflict and keep processing (CFEX_IGNORE_OPERATION), try to correct the situation (CFEX_FORCE_APPLY), stop replication (CFEX_STOP_REPLICATION), or allow the replication software to decide how to resolve the conflict (CFEX_DEFAULT).

When a conflict is detected for a compare operation, the following are at least two valid actions: 1) ignore the inconsistency but continue with the compare operation (CFEX_IGNORE_OPERATION), or 2) stop replication for the subscription that detected the conflict (CFEX_STOP_REPLICATION).

In accordance with aspects described herein, there may be additional actions that make sense in this situation, including:
Stop the compare operation (CFEX_STOP_COMPARE)—a use of this option is where the conflict exit is being used to report an inconsistency, but some other process is to be used to correct the problem. This is a form of audit reporting;
Stop the compare operation and replace the target record with the contents received from the source (CFEX_STOP_AND_REPLACE_RECORD)—this option forces re-synchronization but does not look for any other inconsistencies that might exist. This can break from processing the compare transaction and replace at least some data of the target data record with data received from any desired source. One such source is source data in a compare record of the plurality of ordered compare records forming the compare transaction, but there are various possibilities for where the replacement data comes from. The overriding idea may be to replace with data to get the source and target back in sync;
Continue the compare operation and, once that is complete, replace the target record with the contents received from the source (CFEX_REPLACE_BUT_CONTINUE)—this allows for a form of audit reporting that can detect all inconsistencies and then force re-synchronization at the end; and Synchronize this inconsistency at the target and continue the compare operation (CFEX_SYNCRONIZE)—this option tells the apply process to fix the inconsistency detected. If the segment data does exist but the segment contents are different, then it can be updated with the source image (e.g. segment data from the compare record). It is noted, however, that this update may or may not be possible depending on the situation. Two example such situations in IMS are when the subject segment is a sequential dependent segment, and when the IMS sequence field is different. If a segment instance does not exist at the target, then synchronization can insert it. That is, a data segment corresponding to the source segment identified by the compare record is inserted into the target data record. For data that exists only at the target and not at the source, synchronization can delete it, assuming the source data is correct.

Detection of Inconsistencies in Database Records with Unique Sequence Fields:

Detecting inconsistencies in a hierarchical structure where each segment has a unique sequence field represents a specific scenario that may be dealt with. When an inconsistency is detected, the exit can choose to use the synchronize option to resynchronize the record and not require the entire record's contents to be deleted and replaced with the source data, which may be required in other scenarios.

Figure 5:
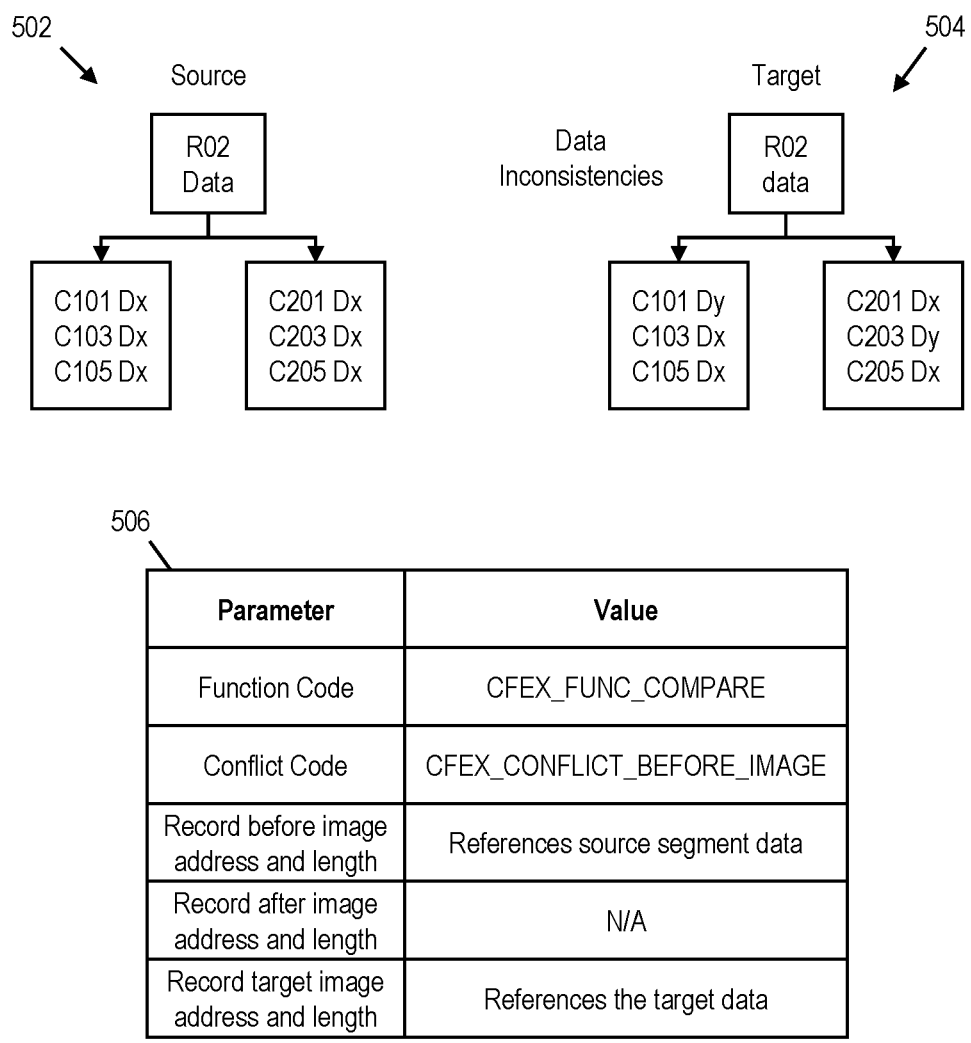
FIGS. 5-8 depict example inconsistencies and results conflict exit interaction, in accordance with aspects described herein.

The apply process can use the segment name and concatenated key information included in each compare record, and the segment name and key feedback area returned from the GNP call, to determine whether there are structural differences between the source and target database record. When the key feedback information and segment name indicate the data returned from the GNP matches a compare record, then a simple comparison of the source segment data against what was returned from the GNP call can be used to determine if there are differences in the actual data. When the contents of a segment are not the same, the conflict exit can be called indicating that a conflict was detected during a compare operation and that the type of conflict is an image inconsistency, and the exit can be passed the image data from the source and target. Examples of this data inconsistency and the exit interaction in accordance with aspects described herein is depicted and described further with reference to FIG. 5.

502 is the source data record and 504 is the target data record. It is noted that the data ("Data") in the root segment R02 in the source record 502 differs from the data ("data") in the corresponding root segment in the target record 504, the data ("Dx") of the first instance (C101) of the CHILD1 segment in the source record 502 differs from the data ("Dy") of the corresponding first instance (C101) of the CHILD1 segment in the target record 504, and the data ("Dx") from the second instance (C203) of the CHILD2 segment in the source record 502 differs from the data ("Dy") of the corresponding second instance (C203) of the CHILD2 segment in the target record 504. In this example, a conflict exit is called three times because of these three differences. For conflict parameters 506, the Function Code parameter would be CFEX_FUNC_COMPARE, the Conflict Code parameter would be CFEX_CONFLICT_BEFORE_IMAGE, the 'Record before image address and length' parameter would reference the source segment data, the 'Record after image address and length' would be not applicable, and the 'Record target image address and length' parameter would reference the target data.

Another scenario is where a segment instance is missing in the target database record. This condition can be detected by comparing the target concatenated key of the next target object retrieved to the source concatenated key from the compare record and if the target concatenated key is logically greater than the source concatenated key, this means that the source segment does not exist in the target database record. This approach may be used for segments with a unique sequence field (key).

Figure 6:
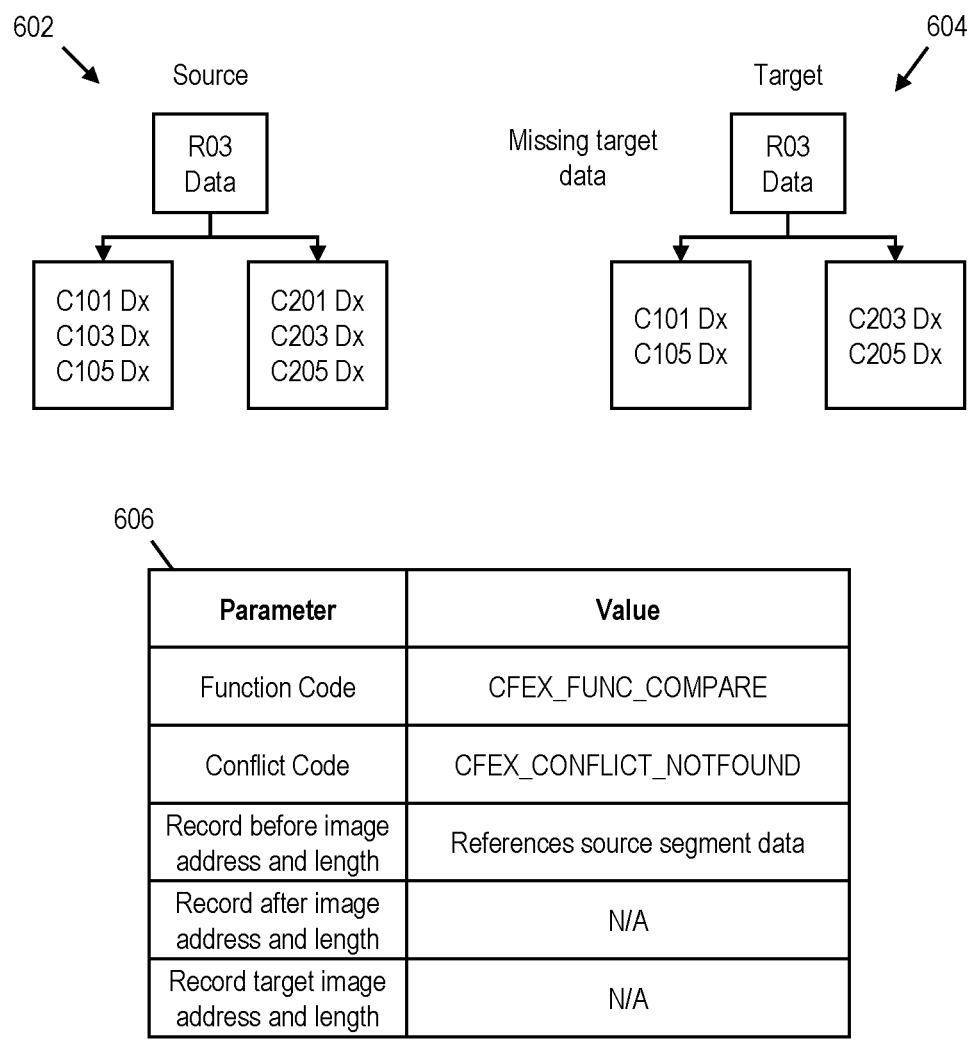

When one of these conditions is detected, the conflict exit may be called indicating that a conflict was detected during a compare operation and that the type of conflict is a not found condition, and the exit can be passed the source image. In this case, there is no target data. Examples of this type of data inconsistency and the exit interaction in accordance with aspects described herein is depicted and described further with reference to FIG. 6.

602 is the source data record and 604 is the target data record. It is noted that both the second instance (C103) in the CHILD1 segment and the first instance (C201) in the CHILD2 segment in source record 602 do not exist in the corresponding CHILD1 and CHILD2 segments in the target record 604. In this example, a conflict exit is called twice because of the two instances not existing in the target record 604. If the exit requests synchronization, this results in the missing CHILD1 and CHILD2 segments (103, 201) being inserted at the target. For conflict parameters 606, the Function Code parameter would be CFEX_FUNC_COMPARE, the Conflict Code parameter would be CFEX_CONFLICT_NOTFOUND, the 'Record before image address and length' parameter would reference the source segment data, and the 'Record after image address and length' and 'Record target image address and length' parameters would be not applicable.

Yet another variation is where data exists at the target that does not exist at the source. This condition can be detected by comparing the target concatenated key of the next target object retrieved to the source concatenated key from the compare record and if the target concatenated key is logically smaller than the source concatenated key, then this means there is data in the target database record that does not exist at the source.

Figure 7:
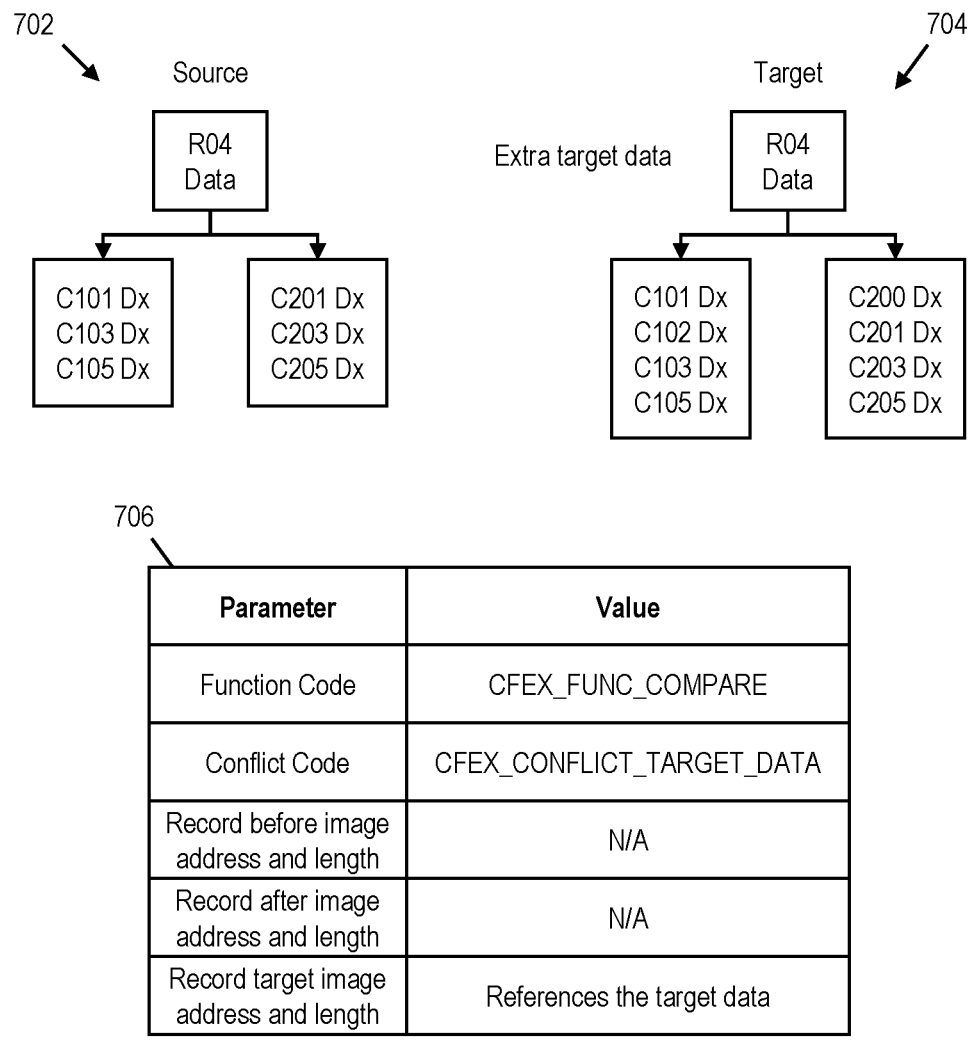

When one of these conditions is detected, the conflict exit may be called indicating that a conflict was detected during a compare operation and that the type of conflict is that there is extra data at the target, and the exit can be passed a pointer to the target data. The pointer to the source data is NULL. Note that it is also possible that this could be considered a "not found" conflict since the exit could determine whether the data was not found (does not exist) by inspecting the pointers to the source and target image data. Examples of this type of conflict and the exit interaction in accordance with aspects described herein is depicted and described further with reference to FIG. 7.

702 is the source data record and 704 is the target data record. It is noted that both the second instance (C102) in the CHILD1 segment in target record 704 and the first instance (C200) in the CHILD2 segment in target record 704 do not exist in the CHILD1 and CHILD2 segments, respectively, in the source record 702. In this example, a conflict exit is called twice because of the two instances not existing in the source record 702. For conflict parameters 706, the Function Code parameter would be CFEX_FUNC_COMPARE, the Conflict Code parameter would be CFEX_CONFLICT_

TARGET_DATA, the 'Record before image address and length' and 'Record after image address and length' parameters would be not applicable, and the 'Record target image address and length' parameter would reference the target data.

Figure 8:
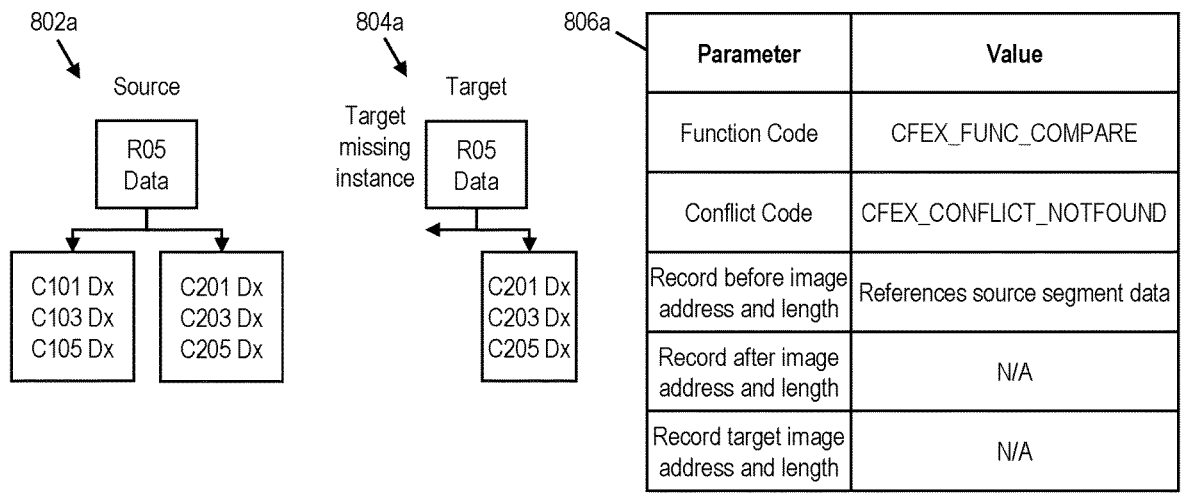
Figure 8:
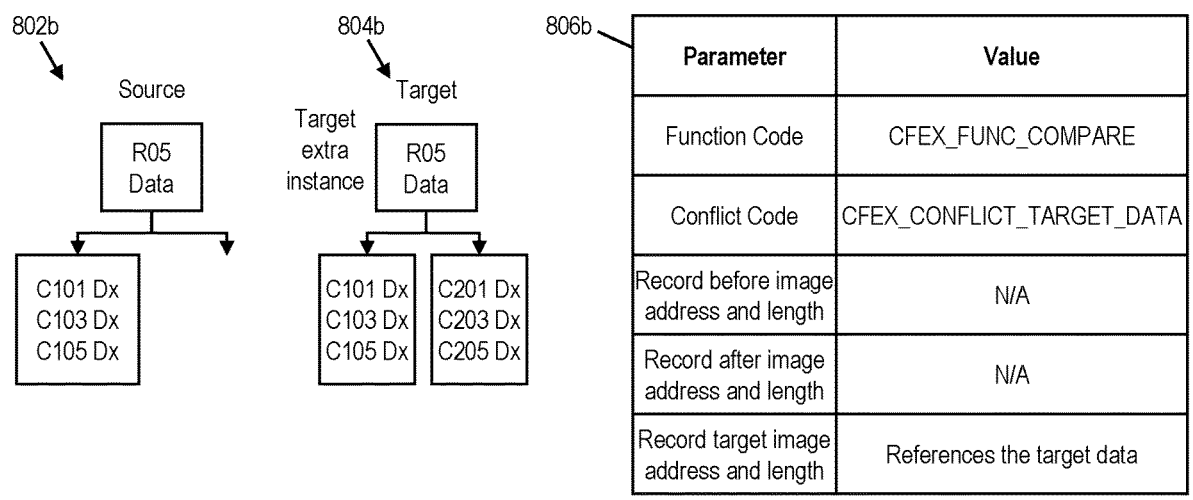

Two additional comparison conflicts that can occur in a hierarchical database are when there are inconsistencies in segment types between the source and target database record, i.e. the target record is missing child instance(s) or the target record includes extra instance(s). Examples of both situations are shown in FIG. 8. As between source record 802*a* and target record 804*a*, target record 804*a* is missing the CHILD1 segment of source record 802*a*. As between source record 802*b* and target record 804*b*, source record 802*b* is missing the CHILD2 segment of target record 804*b*.

The compare records can include the segment name, and the feedback information returned from the GNP call can identify the name of the segment instance returned. In a hierarchical database, such as IMS, each segment has metadata associated with it that identifies its level in the hierarchy (e.g. the root is level 1, children of the root are level 2, children of a level 2 segment is level 3, etc.) and a segment code that identifies the position of the segment within the database record.

In the example records in FIG. 8, the root has a segment code of 1, CHILD1 has a segment code of 2 and CHILD2 has a segment code of 3. When the GNP call returns a different segment name than the matching/corresponding source compare record, then obtaining the segment code for the current comparison segment and the one returned from the GNP call can be used to determine whether data is missing at the source or extra data exists at the target. When the source segment code is less than the target segment code, this means the data does not exist at the target. When the target segment code is less than the source segment code, there is extra data in the target database record. These conditions may be logically the same as the missing or extra segment instance conditions discussed above. For conflict parameters 806*a* (the target missing instance case), the Function Code parameter would be CFEX_FUNC_COMPARE, the Conflict Code parameter would be CFEX_CONFLICT_NOTFOUND, the 'Record before image address and length' parameter would reference the source segment data, and the 'Record after image address and length' and 'Record target image address and length' parameters would be not applicable. For conflict parameters 806*b* (the target extra instance case), the Function Code parameter would be CFEX_FUNC_COMPARE, the Conflict Type parameter would be CFEX_CONFLICT_TARGET_DATA, the 'Record before image address and length' and 'Record after image address and length' parameters would be not applicable, and the 'Record target image address and length' parameter would reference the target data.

To assist in making decisions, additional DBMS-specific information can be passed to the conflict exit. This information can be extended when conflicts are detected during a comparison operation. Additions to IMS-specific information can include, as examples:

Target concatenated key length;
A pointer to the target concatenated key;
Number of source segments in the record;
Number of comparison operations performed;
Total number of conflicts detected for record;
Number of segment mismatches;
Number of source segments that do not exist in the target database record; and
Number of extra target segment instances.

Comparison metrics allow the exit to understand how inconsistent the database record is. In the case where there are significant differences in the records contents, the conflict exit may decide to stop the comparison operation and replace the record with the source contents.

One of these replace operations requires deleting the root segment and then treating each source compare record in the UOR as an insert operation. A selection may be made as to whether this action is performed immediately when requested by the conflict exit or whether the replication solution decides to mark the comparison UOR as something akin to a "record refresh" and return it to a dependency graph, akin to how a target deadlock may be handled. Accordingly, these aspects can detect an inconsistency in a writer using a compare transaction, consider the UOR not "applied" and returning to the work queue as an available dependency with a flag indicating this is now a replace transaction, and allow the next available writer to process the UOR for replacement of data rather than validation. Thus, based on detecting the inconsistency, the compare processing could determine the compare transaction as being 'not applied', and return the compare transaction to a work queue of the target system as an available dependency and flagged to indicate that the compare transaction is to be treated as a replace transaction by subsequent processing to effect replacement of data in the target data record with data of the source data record.

There is also a special case where the database record does not exist at the target. In one embodiment, there is no need to continue calling the conflict exit for each/any child segment, so a request to synchronize the root may result in the compare UOR being converted into an insert operation. In an example implementation, the conflict exit may be called (at least in processing the compare record for the root) and it would confirm/request the insert operation. Thus, if in attempting to locate and read a target root segment corresponding to a compare record being processed at the target fails (e.g. is not found), the processing of that compare record can include or initiate conversion of the whole UOR (compare transaction) into insert operation(s) to insert a record into the target.

Unkeyed Segments:

For database structures containing segments without a sequence field (unkeyed), the concatenated key cannot be used during the comparison process. The segment name can still be used to determine whether the source and target records are structurally different at the segment level.

Figure 9:
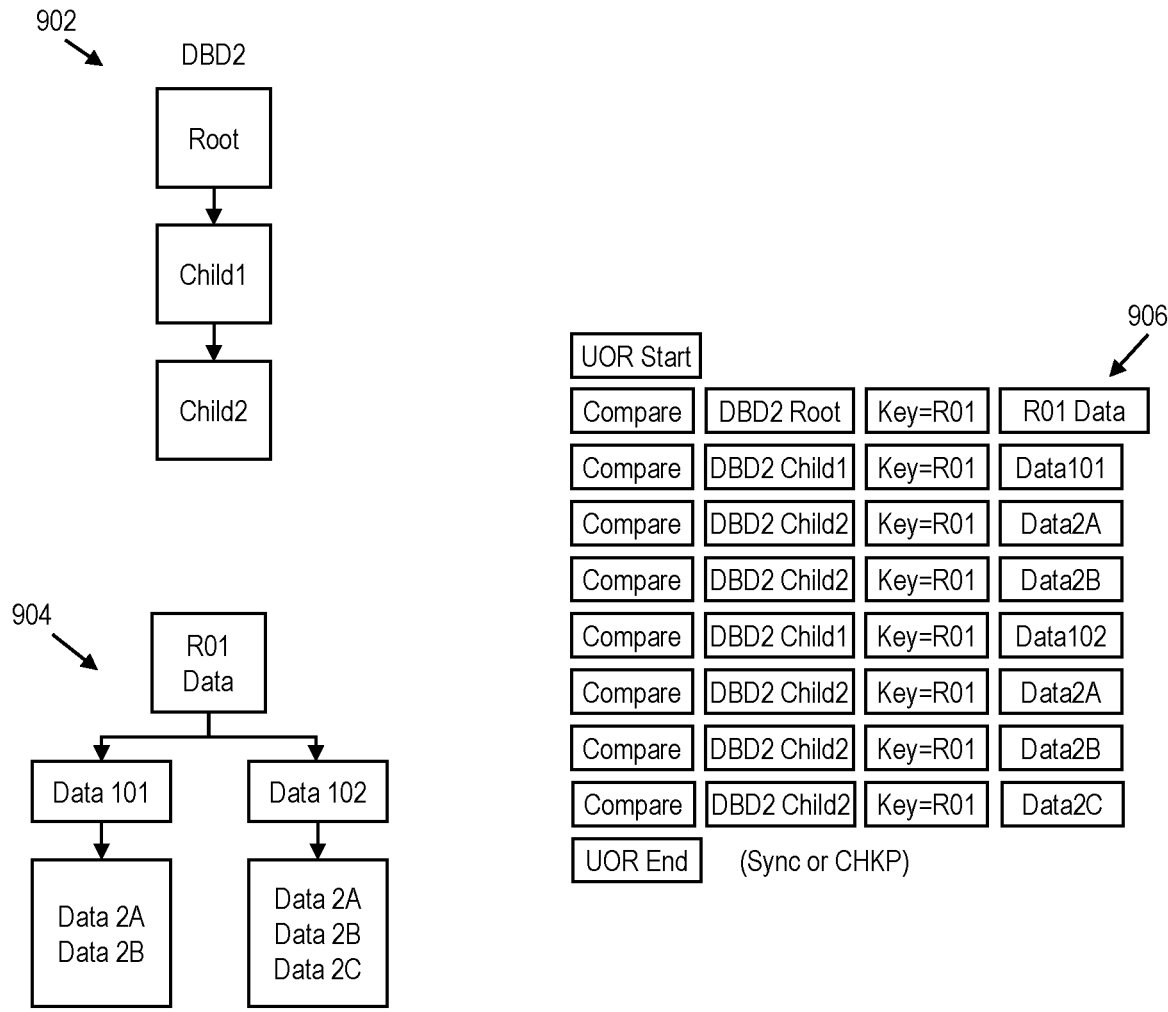
FIG. 9 depicts another representation of a database structure, sample database record, and example records of a corresponding compare transaction, in accordance with aspects described herein.

FIG. 9 depicts an example representation of a database record that includes a root segment and two children, neither of which has a sequence field. This example shows a three level hierarchy database structure with (902) depicting a root segment record (Root) having a second-level child segment (Child1) and third-level child segment (Child2). 904 shows sample record contents with a root key of R01 for the root record, and two instances (Data101, Data102) of the second-level child segment, with the first instance (Data101) containing two instances (Data2A and Data2B) of the third-level child segment and the second instance (Data102) having three child instances (Data2A, Data2B and Data 2C).

906 presents the compare records generated for this database record 904. Each of these compare records has the same concatenated key value—R01. It is also noted that while the data capture log record includes segment image data for insert/update/delete operations all parent segments that do not have a unique sequence field so that the proper instance can be found at the target, in accordance with these aspects, since the comparison UOR contains all segments in hierarchical sequence, it is not necessary for the compare UORs to additionally include such segment image data for all parent segments. Consequently, only one segment image element is included in these compare records.

Figure 10:
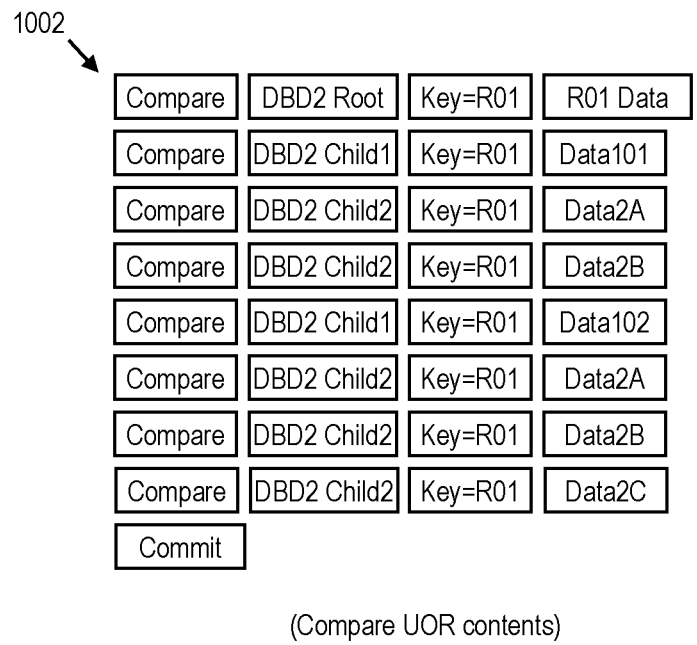
FIG. 10 depicts another example compare transaction and commands issued by an apply process in processing the compare transaction, in accordance with aspects described herein.
Figure 10:
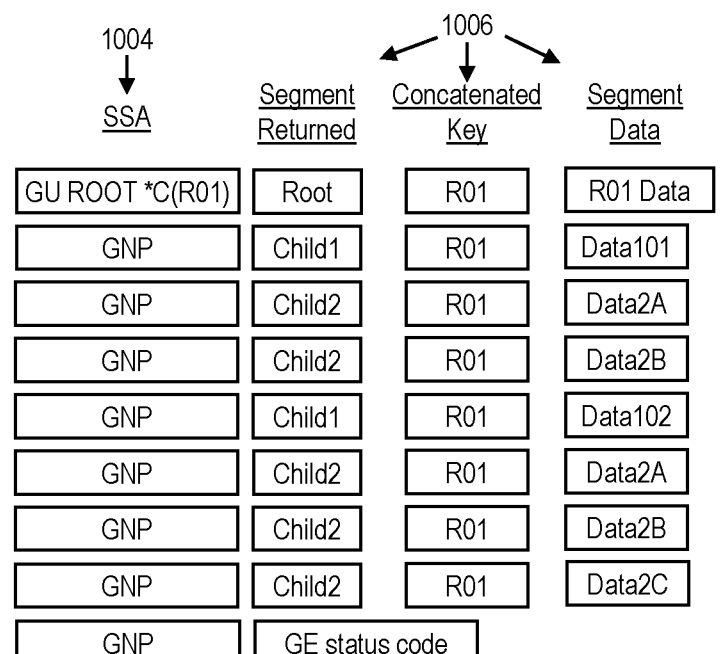

FIG. 10 presents a compare transaction and commands issued by an apply process in processing the compare transaction of FIG. 9, in accordance with aspects described herein. 1002 depicts contents of a compare UOR, specifically the list of compare records thereof and a commit record. 1004 depicts the list of segment search arguments (SSAs), and 1006 depicts the list of segment information returned in response to issuing the SSAs and resulting from these retrieval calls issued at the target. List 1006 shows the results when the target record matches the source records contents. When the target record does not match the source, attempts to continue the compare process or to try to incrementally fix the target database record can result in the conflict exit being called heavily. This could result in the target record at least temporarily becoming even more out-of-sync with the source record until the process completes.

Figure 11:
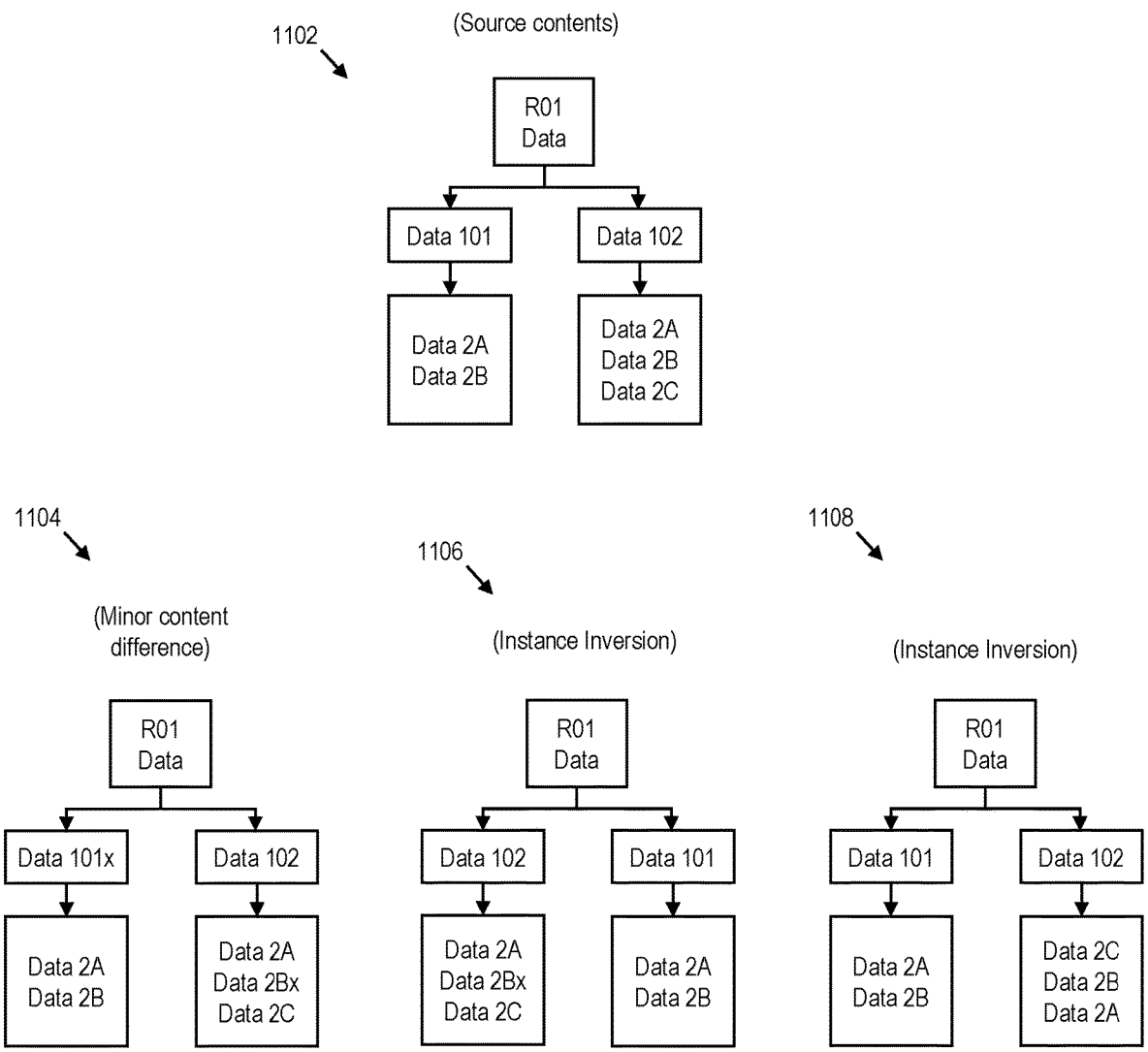
FIG. 11 depicts additional examples of inconsistencies between a source record and a target record.

FIG. 11 depicts some example inconsistencies between a source record 1102 and target records 1104, 1106, and 1108.

In the first example (comparing source record 1102 and target record 1104), the source record 1102 and target record 1104 are largely the same but differ in that (i) the first Child1 segment (Data101) of the source differs from the first Child1 segment (Data101x) of the target, and (ii) the second Child2 segment (Data2B) under the second Child1 segment (Data102) of the source differs from the second Child2 segment (Data2Bx) under the second Child1 segment (Data102) of the target. In this scenario, the conflict exit may be called twice reporting a before image conflict, and a request to synchronize would result in those two target segments (for Data101x and Data2Bx) being updated with the corresponding source segment contents.

In the second example (comparing source record 1102 and target record 1106), an instance inversion is present in which the contents of the two Child1 instances (Data 102 and Data101) at the source record were inserted in reverse order at the target. The conflict exit may be called multiple times if it chooses to use the synchronize option: 1. Data inconsistency for the Data101 segment; 2. Extra target data for the Data2C segment; 3. Data inconsistency for the Data102 segment; and 4. Not found condition for the source Data2C segment In a third example (comparing source record 1102 and target record 1108), an instance inversion is present in which the first and last Child2 segments (Data2A and Data2C, respectively) under the second Child1 instance (Data102) at the source were switched under the second Child1 instance (Data102) at the target. Since there are the same number of Child2 instances at the target, these can be reported as before image conflicts.

While it may be possible for the apply logic to detect some of these inversions, it may not be particularly useful to the conflict exit. The source and target records are not consistent and it may be unlikely that the apply process is be able to determine how/why these inconsistencies were created.

Special Considerations for Sequential Dependent Segment Conflicts:

A fast path database can contain a single sequential dependent segment (SDEP) that is defined as the first child segment in the database. SDEP databases do not have a sequence field and cannot be updated or deleted using standard Data Language Interface (DL/I, also referred to as "Data Language/One") calls. Because of these restrictions, if a before image mismatch or target data conflict is reported, the conflict cannot use the synchronize return code to fix the problem. An attempt to do so could result in the conflict exit being called again with the iteration count being incremented by one. A new conflict modifier can be introduced to indicate that conflict was detected while comparing an SDEP, which the conflict exit can interrogate so that it knows not to attempt to synchronize these kinds of inconsistencies at the instance level. If these kinds of inconsistencies are reported for an SDEP, the conflict exit can use one of the following options to get the database record synchronized: 1. Stop the compare operation and replace the target record with the contents received from the source (CFEX_STOP_AND_REPLACE_RECORD); or 2. Continue the compare operation and, once that is complete, replace the target record with the contents received from the source (CFEX_REPLACE_BUT_CONTINUE).

A conflict exit can use the synchronize option when a 'not found' condition is reported for an SDEP, which causes a new SDEP to be inserted at the end of the twin chain.

Special Considerations for Segments with Non-Unique Sequence Fields:

Full function databases allow child segments to have a non-unique sequence field. From a conflict detection and handling perspective, these kinds of child segments can report 'not found' and target data conflicts when key values exist at the source but not the target (CFEX_CON-FLICT_NOTFOUND) or exist at the target but not the source (CFEX_CONFLICT_TARGET_DATA), and can report before image conflicts for keys that match at the source/target but for which the segment images do not match.

It is also possible to report multiple before image conflicts followed by one or more 'not found' conditions for the same key value when there are more source instances with the same key value. Alternately, if there are multiple instances for the same key value, but more at the target than in the source record, then potentially, one or more before image conflicts can be detected followed by target image conflicts for each additional key instance at the target.

Detection and Resolution of Inconsistent Subset Pointers:

IMS data entry databases (DEDB) provide for the use of subset pointers which allow an application to directly access a child segment instance without having to traverse through the twin chain. This can result in a performance boost when there is a long twin chain or development of special purpose applications that use the subset pointer feature to identify specific instances that are of interest.

In implementations, any child segment can have up to eight different subset pointers defined, and the pointer(s) to the specific child instance(s) is/are stored in the prefix area of the parent segment. The prefix is an internal IMS construct that is not accessible to application programs that access/update IMS data.

The IMS database definition identifies how many subset pointers exist for a segment, and then the application can reference a subset pointer by number (1 through 8) in an application segment search argument (SSA) to retrieve the child segment or set, clear, move, or conditionally set a subset pointer reference to a child segment.

To validate that the subset pointers in the target database record are consistent with those of the source database record, this information can be included in the comparison UOR. The IMS data capture log records can include information that the source application uses a specific subset pointer to access a child segment. Hence, this information may be included in the comparison UOR as subset read operations. This can be done by including a respective compare record for each subset pointer that exists in the source database record, and include such compare record immediately after the record corresponding to the parent segment.

Figure 12:
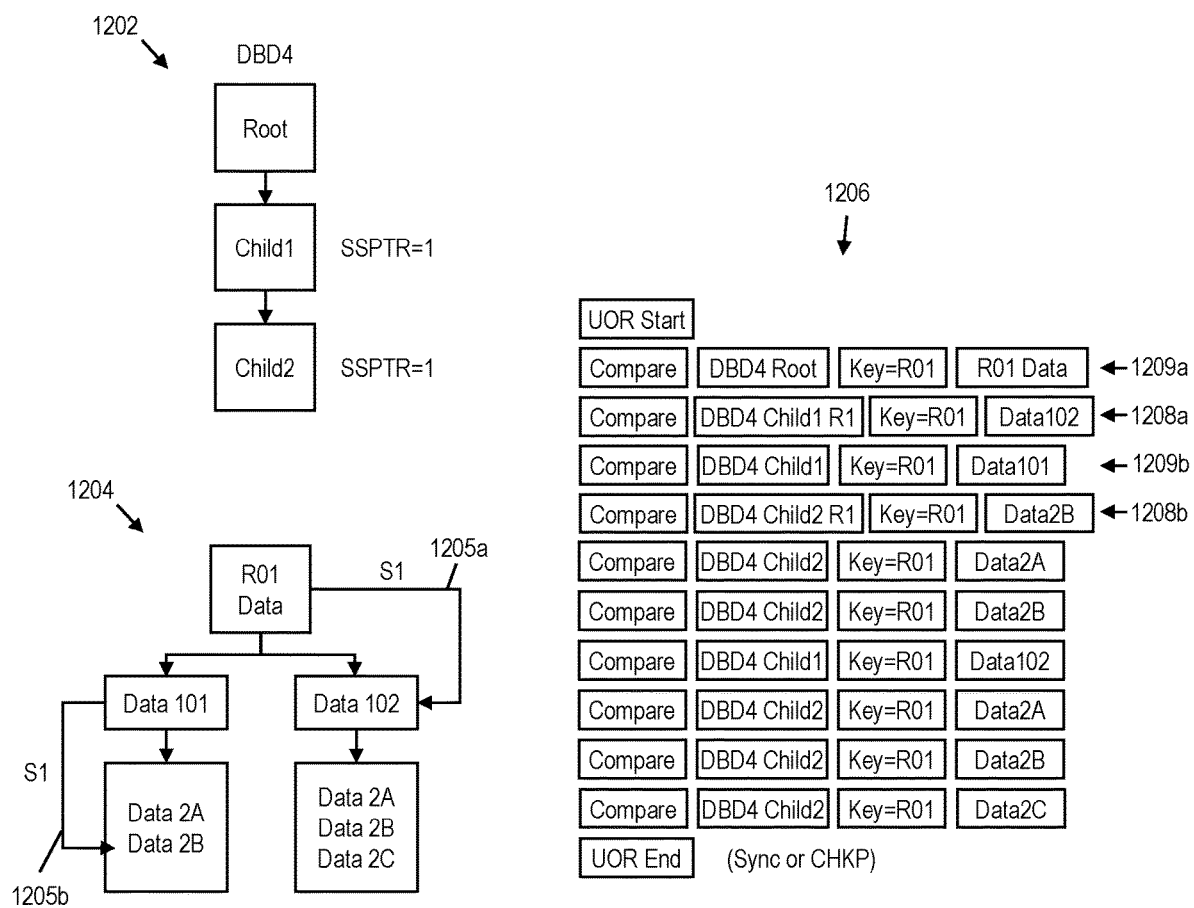
FIGS. 12-13 depict representations of a database structure, sample database records having pointers, and example records of a corresponding compare transaction, in accordance with aspects described herein.

FIG. 12 depicts (as 1202 in FIG. 12) the example representation of the database record of FIG. 9 having a three-level hierarchy, except that it provides 2 subset pointers. Here, the Child1 and Child2 segments each support a single subset pointer. In this example, database record 1204 has two Child1 instances—Data101 and Data102. Each Child1 instance has respective Child2 instances. The root segment of database record 1204 having a key of R01 has a Child1 subset pointer indicated by 1205a pointing to the second Child1 instance (Data102), and the first Child1 instance (Data101) has a Child2 subset pointer indicated by 1205b pointing to the second instance (Data2B) of the Child2 segment.

1206 presents the compare records generated for this database record 1204. The compare records 1206 include a compare record 1208a with a subset pointer read operation (DBD4 CHILD1 R1) that references the Data102 segment. This record 1208a immediately follows the compare record 1209a corresponding to the root segment. The compare records 1206 also include a compare record 1208b with a subset pointer read operation (DBD4 CHILD2 R1) that references the Data2B segment, and this record 1208b immediately follows the compare record 1209b corresponding to the first Child1 instance.

Figure 13:
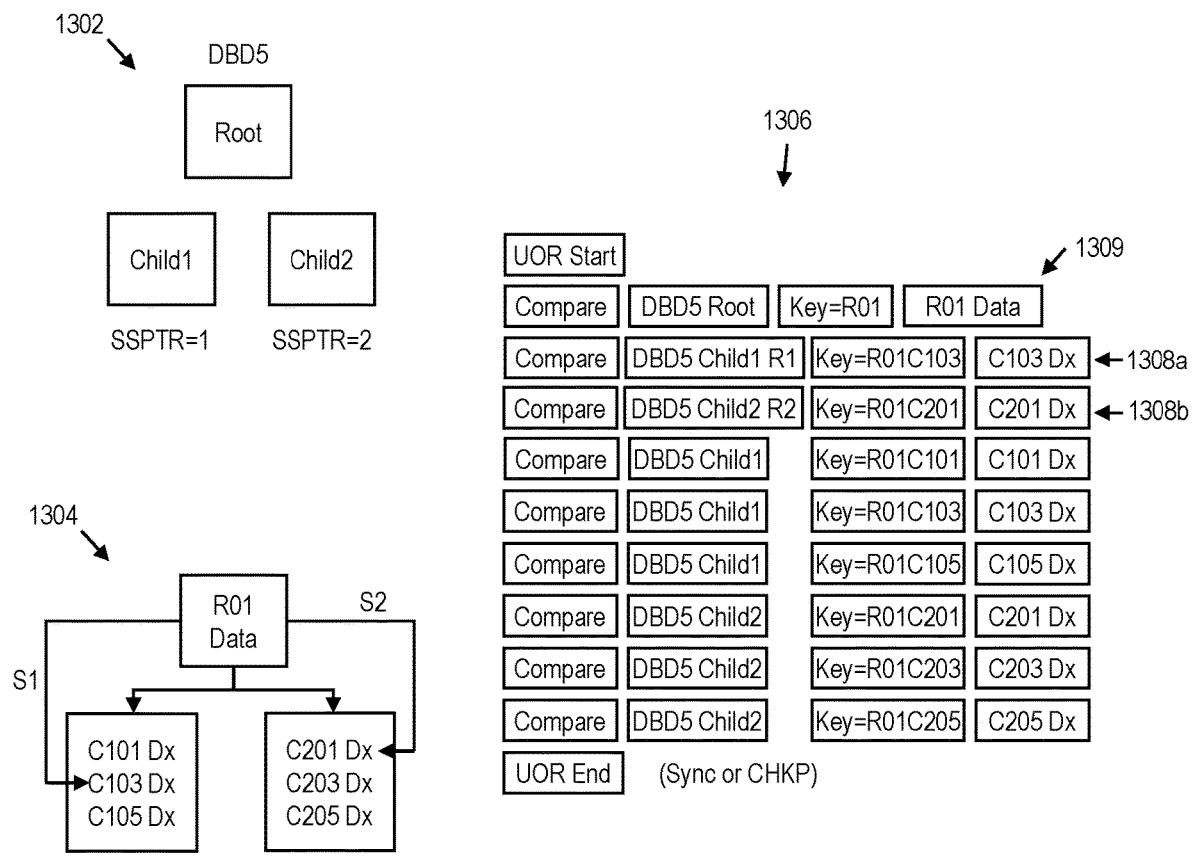

FIG. 13 a more complicated scenario with a two-level hierarchy 1302 with one child segment having a single subset pointer and the other child segment supporting two subset pointers. In data record 1304, for the Child1 segment, key R01 references the C103 Dx segment with subset pointer S1, while for the Child2 segment, only the second subset pointer (S2) has been valued and it references the C201 Dx segment.

1306 presents the compare records generated for this database record 1304. The compare records 1306 include (i) compare record 1308a with a subset pointer read operation (DBD5 CHILD1 R1) that references the C103 Dx segment and (ii) a compare record 1308b with a subset pointer read operation (DBD5 CHILD2 R2) that references the C201 Dx segment, both immediately following, in that order, the compare record 1309 corresponding to the root segment. While Child2 has two subset pointers, the first one (S1) was not set and so no compare record was generated for that unset subset pointer, in this example.

Figure 14:
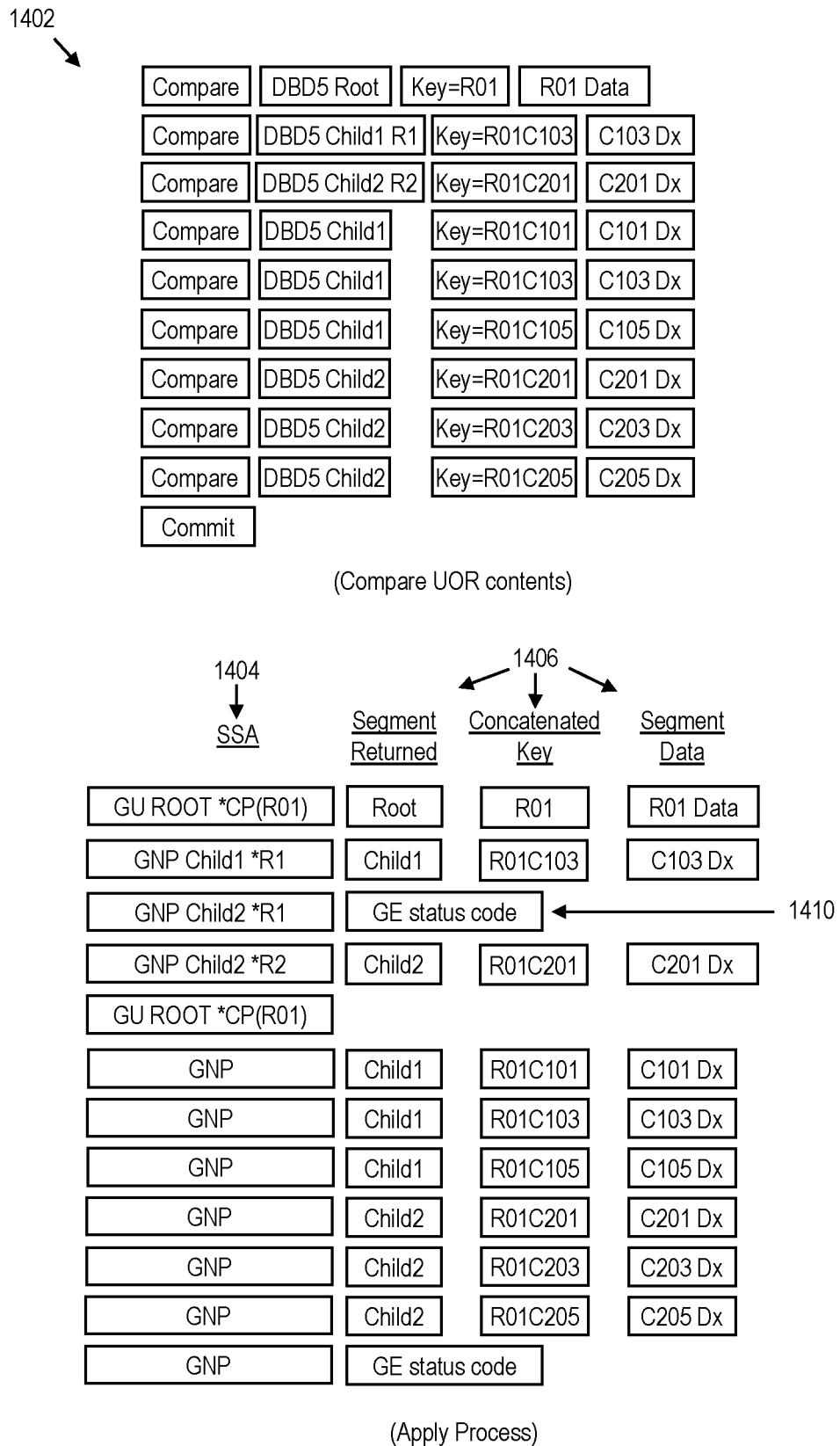
FIG. 14 depicts an example compare transaction including pointer information, and commands issued by an apply process in processing the compare transaction, in accordance with aspects described herein.

Example DL/I calls to extract and compare subset pointer information are shown in FIG. 14. Specifically, FIG. 14 presents a compare transaction and commands issued by an apply process in processing the compare transaction of FIG. 13, in accordance with aspects described herein. 1402 depicts contents of the compare UOR, specifically the list of compare records thereof and a commit record, 1404 depicts the list of segment search arguments (SSAs) that the apply process issues to verify the information that was written to the log. An analogous call sequence was done to generate the log records (compare records of the UOR) in the first place. 1406 depicts the list of segment information returned in response to issuing the SSAs and resulting from these retrieval calls issued at the target.

For each segment that has direct child segments that support subset pointers (this can be determined by inspecting the IMS DBD or DMB control blocks), a series of calls is issued for each possible subset pointer that maintain current position and include the subset pointer number to be retrieved. In FIG. 14, three such calls are issued, one (GNP CHILD1*R1) for the Child1 segment, and two (GNP CHILD2*R1 and GNP CHILD2*R2) for the Child2 segment. There is no subset pointer information for the first subset pointer for Child2, so the GE (not found) status code 1410 is expected here. Once all the subset pointer validation calls have been issued, which could include attempting to retrieve all possible subset pointers of the target to verify that only those reflected by the compare record are set, a 'get unique' call (GU ROOT*CP(R01) in FIG. 14) is issued to re-establish position on the parent, followed by a series of GNP calls to retrieve the direct and indirect dependent segments for the record.

Example inconsistencies that might exist include (i) the subset pointer references a different segment at the target, (ii) the subset pointer is not set at the target, and (iii) the subset pointer is not set at the source but is set at the target.

For example inconsistency (i), the subset pointer references a different segment at the target, the conflict exit parameter signature can indicate: a Function Code parameter as CFEX_FUNC_COMPARE, a Conflict Type parameter as CFEX_CONFLICT_BEFORE_IMAGE, a Conflict Modifier parameter as CFEX_SSP_UPDATE_ONLY, a 'Record before image address and length' parameter as referencing the source segment data, a 'Record after image address and length' parameter as not applicable, and a 'Record target image address and length' parameter a referencing the target data. The synchronize action could be to set the subset pointer to the correct instance in the target, and a secondary error condition can be that the source segment does not exist at the target.

For example inconsistency (ii), the subset pointer is not set at the target, the conflict exit parameter signature can indicate: a Function Code parameter as CFEX_FUNC_COMPARE, a Conflict Type parameter as CFEX_CONFLICT_NOTFOUND, a Conflict Modifier parameter as CFEX_SSP_UPDATE_ONLY, a 'Record before image address and length' parameter as referencing the source segment data, and a 'Record after image address and length' parameter and a 'Record target image address and length' parameter as not applicable. The synchronize action could be to set the subset pointer to the correct instance in the target, and a secondary error condition can be that the source segment does not exist at the target.

For example inconsistency (iii), the subset pointer is not set at the source but is set at the target, the conflict exit parameter signature can indicate: a Function Code parameter as CFEX_FUNC_COMPARE, a Conflict Type parameter as CFEX_CONFLICT_TARGET_DATA, a Conflict Modifier parameter as CFEX_SSP_UPDATE_ONLY, a 'Record before image address and length' parameter and a 'Record after image address and length' parameter as not applicable, and a 'Record target image address and length' parameter as referencing the target data. The synchronize action could be to clear (delete) the subset pointer at the target.

If any of these inconsistencies are detected, the conflict exit can be called to resolve the issue. The conflict modifier is set to indicate this is a subset pointer comparison (CFEX_SSP_UPDATE_ONLY) versus an inconsistency detected during a normal segment comparison operation. Another option would be to add a new conflict modifier such as CFEX_SSP_COMPARE.

When one of these inconsistencies is detected, the conflict exit can respond with any desired comparison return code values. If the exit requests a synchronization operation (CFEX_SYNCRONIZE), this results in an attempt to set the subset pointer to the proper target instance when the subset pointer number exists at the source, or deleting the subset pointer number when it does not exist at the source but does exist at the target.

In the first two situations, the apply process can generate an SSA referencing the correct target segment instance and include the S command code and appropriate subset pointer number and issue a GU call to perform the actual update. To delete a target subset pointer, the same approach may be used but the SSA for the target segment can include a Z command code instead of an S command code.

It is possible that the set operation fails because the source segment does not exist at the target. If this condition exists, the GU call can return a GE status code, causing the conflict exit to be called again with the iteration count being incremented by one. While it may be possible for the exit to request insertion of the missing target segment if it has a sequence field, if the segment does not have a sequence field, the apply process could not know where it should be inserted in the twin chain and so this risks further corrupting the target database record.

When called for one of the secondary error conditions, the exit can respond with one of the following example options:
Ignore the operation (CFEX_IGNORE_OPERATION);
Stop replication (CFEX_STOP_REPLICATION);
Stop the compare operation (CFEX_STOP_COMPARE);
Stop the compare and replace the database record (CFEX_STOP_AND_REPLACE_RECORD); or
Continue the compare and then replace the database record (CFEX_REPLACE_BUT_CONTINUE).

Based on the exit requesting a reload of the database record when subset pointers exist, then based on the apply process encountering a subset read record, it can cache information about the target segment including segment name, subset pointer number, and information to identify the correct segment instance. In the case of a segment with a sequence field, all that may be required is the sequence field key value, while the full segment image may be required for a segment without a sequence field.

When the corresponding compare record for the segment image is encountered that will be inserted at the target, the insert SSA can include the appropriate S command code and subset pointer number(s) when a match occurs with the cached subset pointer data for that record.

Accordingly, and more generally with respect to compare processing described herein, source data records can include pointer(s) (logical cursor(s), link(s), or the like), with each such pointer pointing from a respective source element of the source data record to a respective target element of the source data record. A compare transaction can include, for each such pointer, a respective compare record placed immediately following a compare record for the source element from which the pointer points. The apply process can verify whether a target data record of the target datastore corresponding to the source data record includes corresponding pointer(s) consistent with (i.e. same source and target elements) the pointer(s) of the source data record.

Detecting Records that Exist at the Target but not the Source:

Aspects above discuss how to detect and resolve conflicts for individual database records and the data of the database records is provided. If dealing with a relatively small database, for instance one with only a few thousand or a million database records, the compare generation utility may have generated comparison UORs for the entire contents of the database. However, for larger databases, it may be likely that comparison UORs are to be generated only for a subset of the records contained in the database.

Database record comparison can be geared toward detecting and correcting inconsistencies between the source and target for specific key values, but, without more, does not address how to verify that the same set of records exists at both the source and target. For a small database, it is possible to read the contents of the source database and stage a single comparison UOR at the source that is processed at the target. One strategy is to include the keys (and optionally a contents hash value of each record) of the database record in the comparison UOR, which increases the size of the database that can be scanned using this approach.

There may be some upper size or optimum size of the data payload in a staged UOR, and once a database/file exceeds the size of one those records, then multiple of these comparison UORs can be staged. An approach for these scenarios is to include the key value from a previous UOR as the first compare record in a subsequent UOR, which allows for detection of extra records at the target by providing essentially a full key range comparison.

Figure 15:
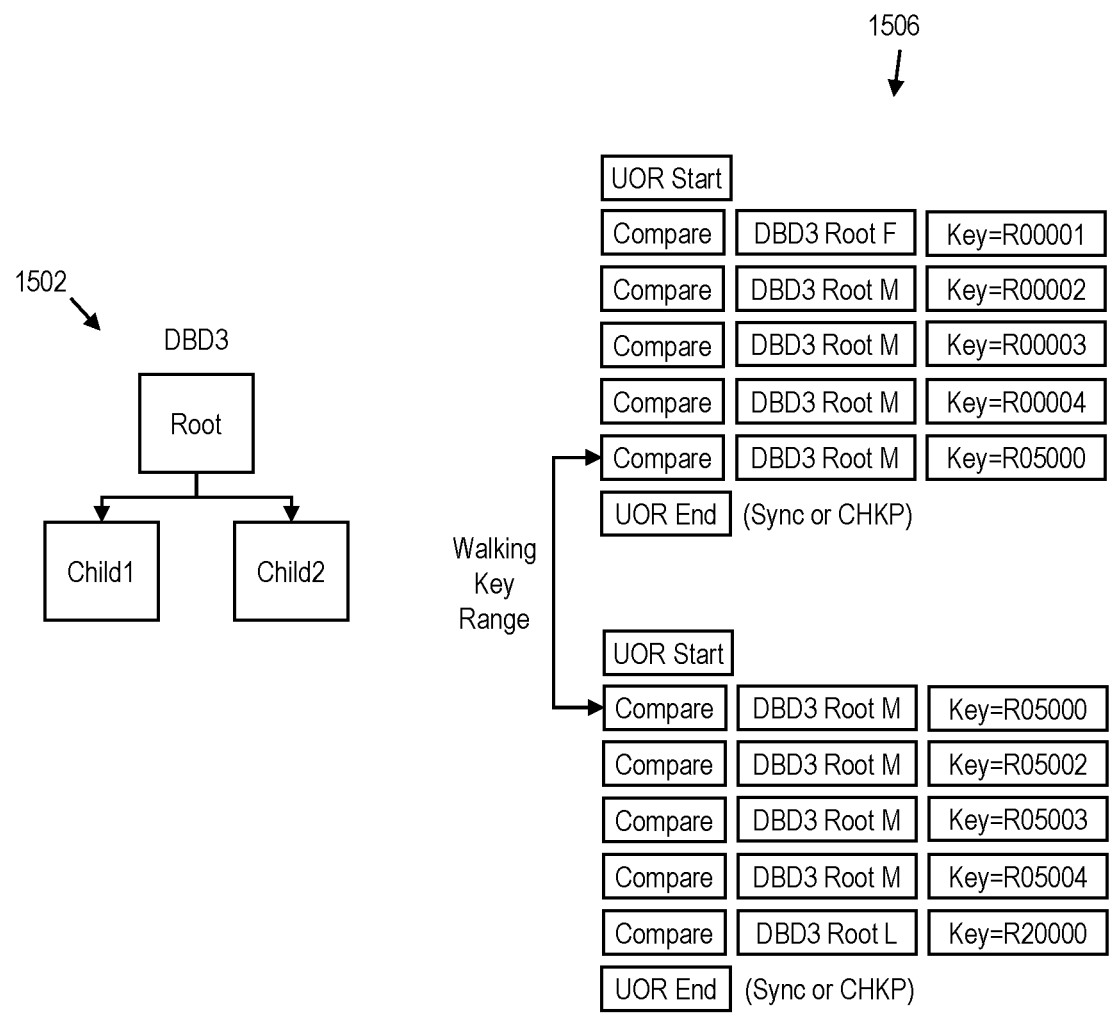
FIG. 15 depicts a representation of a database structure and example records of a corresponding compare transaction for a key-based comparison operation, in accordance with aspects described herein.
Figure 16:
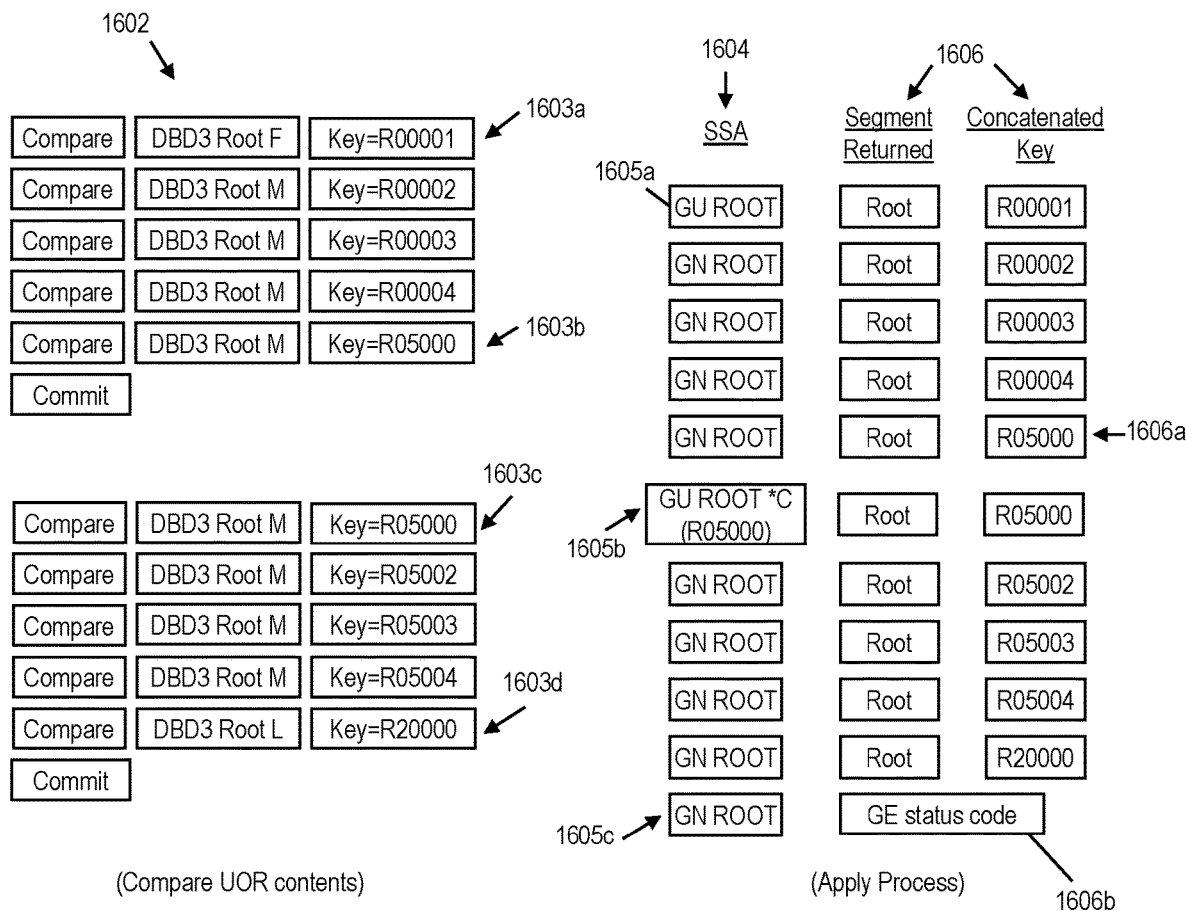
FIG. 16 depicts example compare transactions and commands issued by an apply process in processing the compare transactions as part of a key-based comparison operation, in accordance with aspects described herein.

FIGS. 15 and 16 depict an approach, termed a walking key approach, in accordance with aspects described herein. This approach is shown for a case where key values but not object data are included in the comparison UOR.

With reference to FIG. 15, 1502 shows a two-level hierarchy. Key comparison UORs 1506 having compare records are built by the source system. In this example, each UOR includes up to five compare records as a way of limiting UOR size. The actual maximum size of a UOR could be much bigger. Each compare record identifies whether the key value indicated by the compare record is (i) the first record in the database, (ii) the last record in the database, or (iii) a record between the first and the last records. There is no need to identify that a key is a carryover from a prior comparison UOR. The first/last in database indicators are used by the target to determine whether there are records that exist before the first or last records reported by the source database.

The inclusion of these indicators, or flags, is shown in the compare records of FIG. 15 at the end of the database/segment identifier (e.g. DBD3 ROOT in this case), and use the following codes: 'F' to indicate a first record in the key comparison operation, 'L' to indicate a last record in the key comparison operation, and 'M' to indicate 'middle' record, meaning a record in between the first record and the last record.

Fast path DEDB databases support multiple areas that can be processed individually by a source application and likewise, HAL-DB databases support multiple partitions that can be processed independently at the source. Attempts to generate walking key comparison records with a subset of areas/partitions could lead to inconsistencies being reported at the target, which references all areas/partitions in the database being compared.

FIG. 16 depicts example scanning logic when processing the key comparison UORs of FIG. 15 at the target. 1602 depicts contents of the two compare UORs involved and corresponding commit records, 1604 depicts the list of segment search arguments (SSAs) that the apply process issues, and 1606 depicts the list of segment information returned in response to issuing the SSAs and resulting from these retrieval calls issued at the target.

The key comparison UORs are ordered. When the first compare record 1603a in the first key compare UOR is identified (by F) as the first key in the comparison operation, then an unqualified 'get unique' call 1605a is issued to retrieve the corresponding first record from the target database. Assuming the key value of the first record from the target database matches the first key, then a series of 'get next' calls are issued, one for each comparison record in that first UOR. For each such comparison, the key returned from the target database by the corresponding GU call is compared with the key in the corresponding compare record. When the last compare record 1603*b* of the UOR is identified as not being the last record in the compare operation (i.e. does not have the L flag), no special processing is required.

When the first compare record in a key compare UOR is not identified as the first key in the comparison operation (i.e. is not identified by the F flag, for instance compare record 1603*c* which is identified by the M flag), then a qualified SSA (e.g. 1605*b*) is used to retrieve the matching target record, and the unqualified 'get next' sequence of operations is continued. The assumption is that this first key value (R05000 in this example) of the first compare record 1603*c* in this UOR was validated when processing the previous key comparison UOR (i.e. validated by 1606*a*), and this is an overlapping key range that can be used to validate that no records exist between the prior validated key and the next key value (i.e. R05002) in the current key comparison UOR.

Additional special processing may be performed when the last compare record in a UOR indicates (using the L flag, for instance as in compare record 1603*d*) that it corresponds to last key in the database. In this situation, an additional unqualified 'get next' call 1605*c* is issued, which can return a GE or GB status code (e.g. 1606*b*) indicating that there are no more records in the database.

Accordingly, the above provides a key-based approach to comparing source records to target records. Each compare record of the received compare records includes a respective key of a respective source object, of the source datastore, to which that compare record corresponds, and the compare transactions/UORs from the source form a key-based comparison operation to compare those source objects to target objects. Processing a compare record in this context can include obtaining from the compare record the key of the source object, retrieving from the target datastore a key of a next target object (perform a read against the target to find the key of the next object), compare the key of that next target object to the key of the source object that is the subject of the compare record, and determine, based on the comparing, whether the key of the next target object matches the key of the source object. If the key of the next target object does not match the key of the source object, further processing the compare record can include: (i) if the key of the next target object is logically smaller than the key of the source object, determining that target object(s) exist in the target datastore that does/do not exist in the source datastore, or (ii) if the key of the next target object is logically larger than the key of the source object, determining that source object(s) exist in the source datastore that does/do not exist in the target datastore.

If instead the keys match, processing can move to the sequentially-next compare record in the UOR, if present, and repeat the reading a next object in the target, and comparing its key to the key in the sequentially-next compare record. This can iterate, each time using the next compare record and the next target object read from the target datastore. Ultimately the last compare record of the UOR will be encountered, and processing will move to the next UOR if that last compare record is not the L record, or will stop if the last compare record of the UOR was the L record in the key compare operation. In this regard, as part of processing each compare record, aspects can check whether the compare record is the L record, i.e. the final compare record for the key-based comparison operation. If so, the iterating halts and the compare processing can issue a final request to retrieve a next target object of the target datastore. If the final request returns an indication that there are no next target objects of the target datastore, then the process determine that the source objects of the source datastore are consistent with the target objects of the target datastore.

The approaches discussed with reference to FIGS. 15 and 16 can work well when the source and target database match. When they do not match, it may be difficult to definitively identify the inconsistencies that do exist. There is also the possibility that "false positives" are also being detected due to source update activity that was occurring when the source key comparison UOR was being written to the source log.

Additional complications could exist depending on whether the database is indexed versus using a randomizer. Table 1 identifies different situations that can be detected when comparing keys from an indexed database:

TABLE 1

| Key Location | Condition after retrieval | Assumed inconsistency |
|---|---|---|
| F | The key returned from the target is logically smaller than the source key. | Records exist at the target that do not exist at the source. There may be multiple of these records and this condition exists until a key is returned that matches the source key or is greater than the source key. This may be a false positive if this is a partitioned database and the source accessed a subset of the source database. |
| F | The key returned from the target is logically larger than the source key | The source database record does not exist at the target. This may be a false positive due to deletion of the record at the source while the key comparison UOR was being built. |
| M | The key returned from the target is logically smaller than the source key. | Records exist at the target that do not exist at the source. There may be multiple of these records and this condition exists until a key is returned that matches the source key or is greater than the source key. |

TABLE 1-continued

| Key Location | Condition after retrieval | Assumed inconsistency |
| --- | --- | --- |
| M | The key returned from the target is logically larger than the source key | This may be a false positive if this is a partitioned database. The source database record does not exist at the target. This may be a false positive due to deletion of the record at the source while the key comparison UOR was being built. |
| L | The key returned from the target database is logically smaller than the source key. | Records exist at the target that do not exist at the source. There may be multiple of these records and this condition exists until a key is returned that matches the source key or is greater than the source key. This may be a false positive if this is a partitioned database. |
| L | The key returned from the target is logically larger than the source key | The source database record does not exist at the target. This may be a false positive due to deletion of the record at the source while the key comparison UOR was being built. |
| L | The key returned from the target is logically larger than the source key | Records exist at the target that do not exist at the source. There may be multiple of these records and this condition exists until no more records exist at the target. This may be a false positive if this is a partitioned database. |

When there are key comparison issues for a database that uses a randomizer, then a different approach can be used that sees the apply process issuing a 'get unique' call with the key from the comparison record to determine whether the record exists at the target. If it does exist, then an assumption can be made that the key read at the target may not exist at the source. In this situation, false positives may be reported if this is a partitioned database or the record was inserted while the key comparison UOR was being constructed.

If the source key does not exist at the target, a look-up can be performed for the next source key in the compare UOR, repeating this until a matching target record is found. Once such record is identified, then any records (keys) that exist between the record where the key mismatch was detected up to the existing source/target record may represent records that exist at the target but not the source.

In a situation where the key for the last UOR in one of the compare UORs cannot be located at the target, the comparison process may not determine what kind of inconsistency may exists between the mismatched key value returned from the target and the keys provided in the comparison UOR. There is no matching record for the last source key in the compare UOR, but it may be unknown whether the keys that were retrieved from the target are not included in the "next" key comparison UOR.

While processing the content of a key comparison UOR, the apply process can call the conflict exit (one or more times) when a key mismatch is detected, reporting that either a target data (CFEX_CONFLICT_TARGET_DATA) or not found (CFEX_CONFLICT_NOTFOUND) condition has been detected. For a 'not found' condition, the source image passed to the exit may contain only key data. The DBMS specific data can also include the first/last/middle flag from the source UOR and a flag indicating whether a middle record is the last in the source UOR.

The following sub-set of conflict exit return codes could makes sense when the exit is called to resolve one of these kinds of conflicts: Ignore operation (CFEX_IGNORE_OPERATION), Stop compare (CFEX_STOP_COMPARE), or Synchronize (CFEX_SYNCRONIZE).

Requesting CFEX_IGNORE_OPERATION implies the exit wants the apply process to continue the compare operation. Presumably the exit has requested reporting and/or performed some external reporting that allows an administrator or other user to follow-up and resolve the inconsistency. Likewise, if the exit requests CFEX_STOP_COMPARE, an assumption might be made that some follow-up procedure can be initiated to try to resolve this situation; it is possible some inconsistency threshold was reached and it would be easier to reload the target.

Requesting the inconsistency be resolved using CFEX_SYNCRONIZE may not be desired and may corrupt the target database due to detection by the apply process of inconsistencies that really do not exist.

In aspects discussed above, each compare record (e.g. compare records shown in FIGS. 15 and 16) can include a hash value of the source data of the source object to which that compare record corresponds. This would enable the target to determine, for a target object, whether the hash of the data of the target matches the hash in the compare record. If they are different, the objects are different. When comparing the keys, then, the hashes could be compared in order to identify target records that are inconsistent with their source counterparts insofar as the hashes of the data of the records not matching. Accordingly, when processing compare records at the target, the process can obtain a hash value of target data of the next target object of the database, compare that to the hash value of the source data of the source object as indicated by the compare record to determine whether they match, and, if they do not, could raise an indication to an administrator of the target system and/or to the source system (as examples) that the source object differs from the target object. A purpose for this indication could be to notify the recipient/source that it may desire to request a full-record compare as described above in which object data is provided in compare records. In particular examples, the hash is included after the F/M/L codes in the example conflict records.

As alluded to above, this could enable a two-phase compare approach: On a first sweep of the target, compare processing finds inconsistencies between source records and target records using the key-based approach described above and the hash values. This could identify any records at the target but not at the source, and also target records that differ from their source counterparts. In follow-up, on a second sweep, a full-record compare as discussed above can be performed to identify specific records with differing target record data, and fix or otherwise address them as desired. The hashing at the source by the compare generation utility can be 'dirty' (i.e. not under lock) on the UOR building for the first sweep, since any records that happened to be modified in the interim would be identified on the first sweep and then fed back for the subsequent, more intensive full data check (second sweep). As another example, aspects discussed below present a 'verified delete' option.

Quiescing a database to be able to perform a clean comparison between static source and the target databases may not be possible or desirable in certain situations, possibly due to the length of time the databases are to be taken offline, requiring applications to be unavailable, as one example. In accordance with aspects however, individual database records can be locked for a relatively short amount of time so that a database record comparison UOR can be created. This short amount of time may not pose a threat to availability, whereas locking an entire database (or setting it in read-only mode) while key comparison UORs are being generated is not likely acceptable.

While it may be true from the standpoint of the replication system that compare operations are being treated as pseudo-update operations that are staged like typical changes and go through standard dependency analysis, allowing database record compares to be done consistently (due to the source read lock which prevents application updates while the data is collected and written to the log), this may not be true for key comparison UORs. This means that a source application might delete a record that was included in a key comparison UOR or add new record(s) that are applied at the target while the key comparison UOR is still being constructed at the source. The larger the key comparison UOR (the more keys included), the longer it can take to construct that UOR. This lengthens the period during which timing issues can occur. Changes may be replicated based on their commit times, so if a source application inserts/deletes a record at time 10 but the key comparison UOR completes at time 100, this gives the source insert/delete time to be applied at the target before the comparison UOR is "applied" at the target, even though it may have started before the application insert/delete did.

Figure 17:
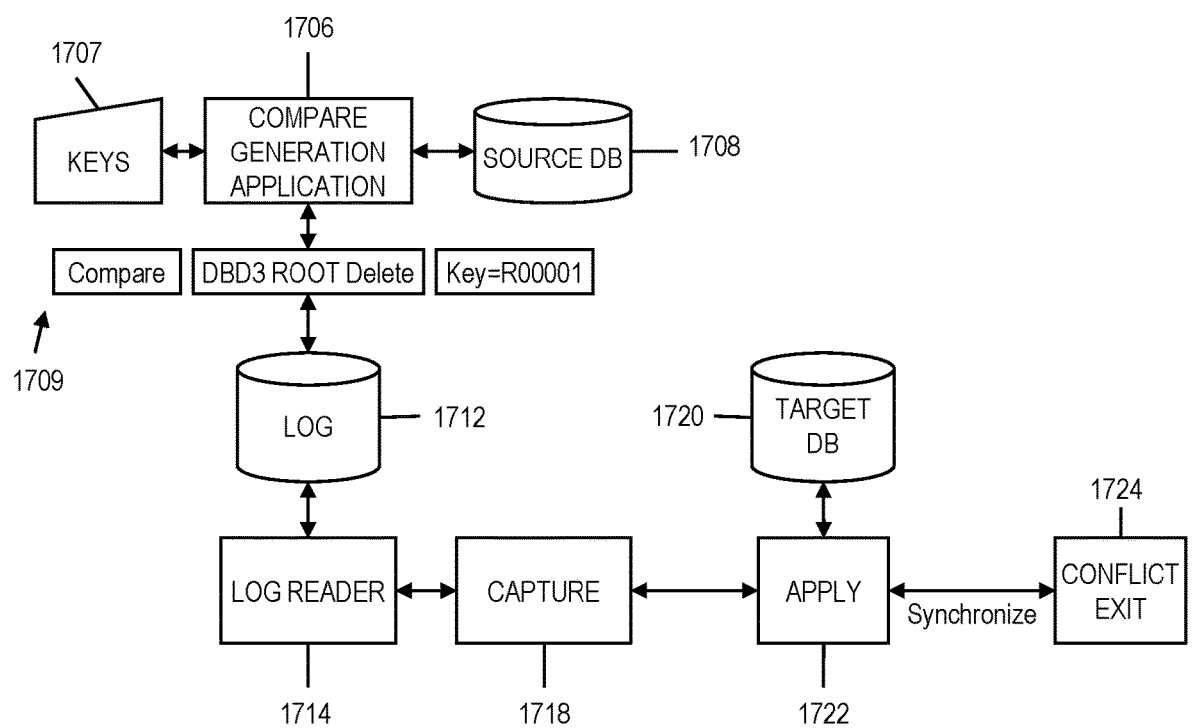
FIG. 17 depicts yet another example replication environment to incorporate and use aspects described herein.

Consequently, another example approach is depicted in FIG. 17, depicting yet another example replication environment to incorporate and use aspects described herein. The compare generation utility 1706 accepts control card input that identifies a list of database objects and keys (1707) that identify records that do not exist at the source 1708 and are to be deleted from the target database 1720. An alternate approach is for an administrator to delete these records at the target, but the approach described here can provide more assurance that the delete is warranted.

The compare generation utility 1706 verifies that the source record for the database/key provided (by 1707) does not exist in the corresponding source database 1708. Provided that is true, then a log record 1709, a variant of a compare record for instance, is inserted to the log 1712. In FIG. 17, the log record 1709 identifies the database root segment, the key, and an indicator (Delete) that this is a target record delete request. The log record 1709 is picked up by the log reader 1714, captured, staged, and transferred (by capture component 1718) to the target. At the target, when the apply process 1722 detects a UOR with the log record 1709, it uses the key provided to read the target database and then calls a conflict exit 1724 indicating this is a compare operation that detected target data that does not exist at the source. If the conflict exit returns CFEX_SYN-CRONIZE, for instance, this causes apply processing 1722 to delete the record from the target database.

A purpose of this 'validated delete' is to allow for identification, external review and confirmation the apparently extraneous records at the target really should be deleted, and using the system to ensure records are only removed if the keys are not at the source after review and confirmation. Feeding these through the source again can ensure, as one example, that the record keys have not in some way become valid during the external process to ensure these should be deleted. Accordingly, compare processing can process each of the received compare records, which identifies target objects existing in the target datastore that were not indicated by the received compare records as existing in the source datastore. The processing can provide to the source system an indication of the identified target objects existing in the target datastore that were not indicated by the received compare records, to facilitate a review and determination by the source system of which, if any, of the identified target objects do not exist in the source datastore and are to be deleted at the target. Based on this review and determination by the source system, the target can subsequently receive, from the source system, in response to providing the indication, and in the form of one or more logged records (e.g. 1712) to be processed by the apply process, indications of which target objects, of the identified target objects existing in the target datastore, are to be deleted at the target, and then delete from the target datastore the target objects that are to be deleted.

Figure 18A:
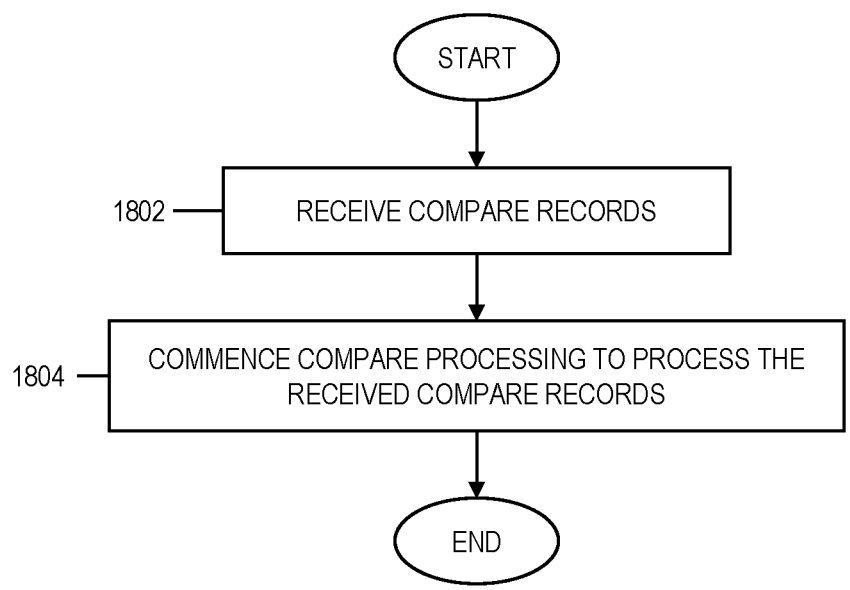
FIGS. 18A-18C depict example processes for compare processing using replication log-injected compare records, in accordance with aspects described herein.
Figure 18B:
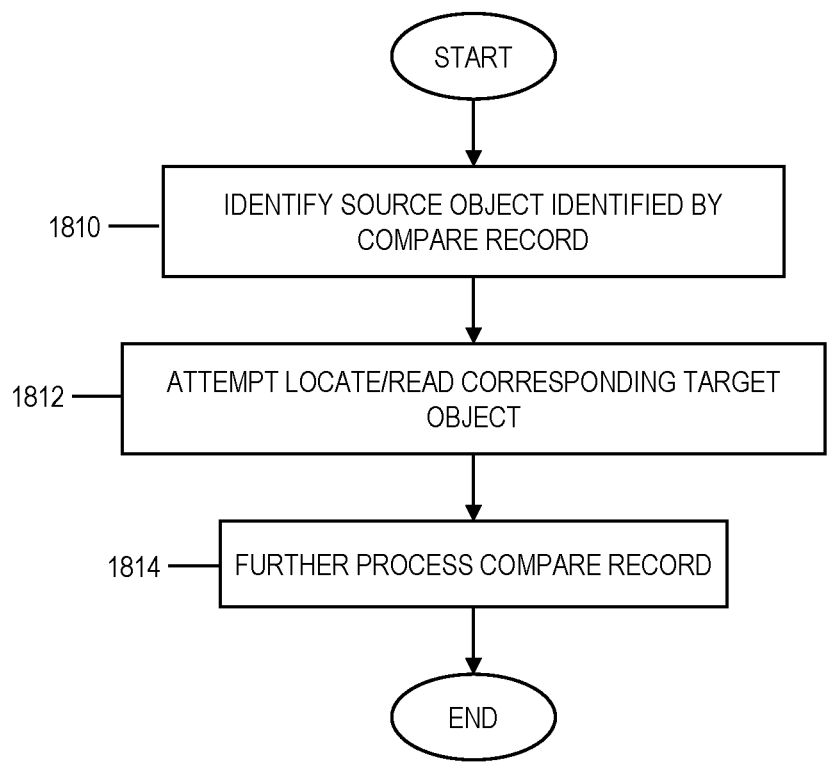
Figure 18C:
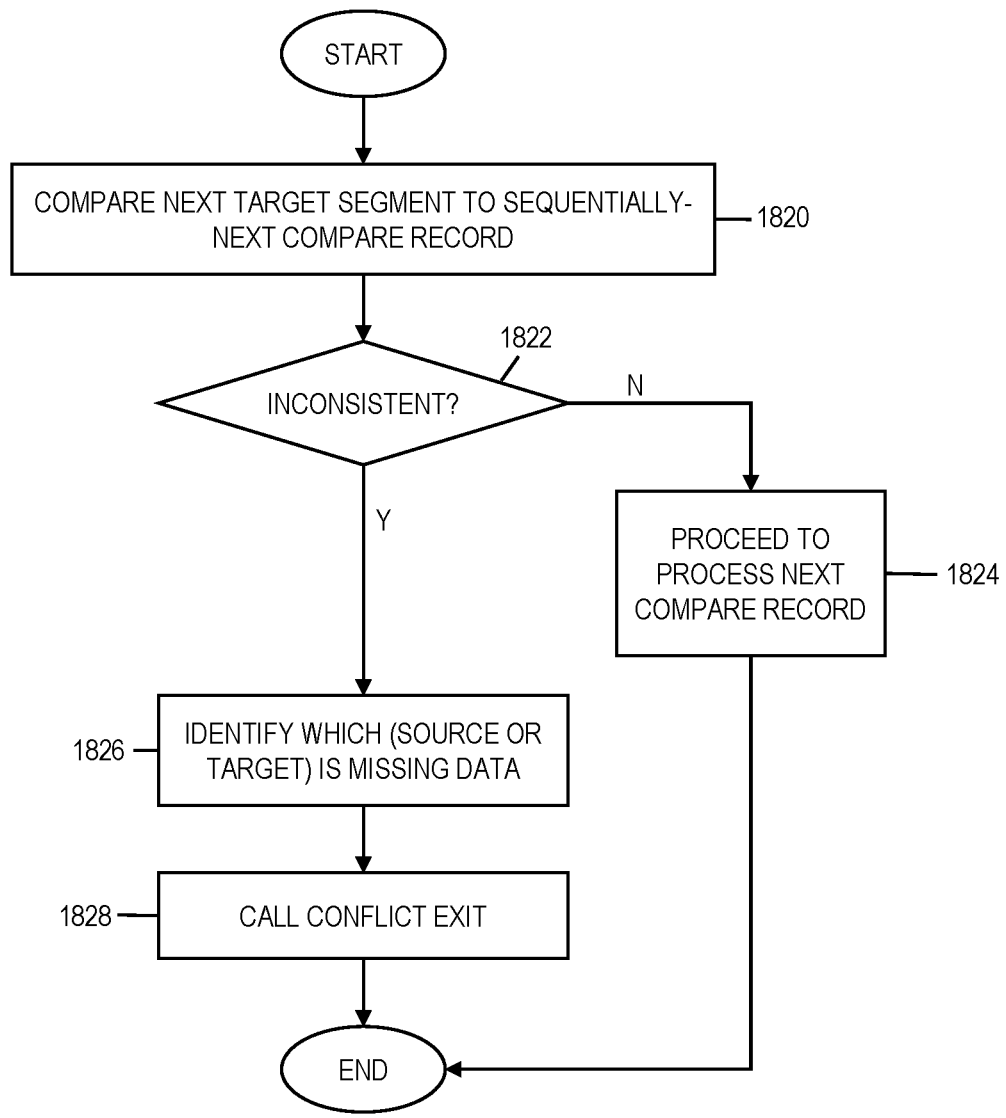

FIGS. 18A-18C depict example processes for compare processing using replication log-injected compare records, in accordance with aspects described herein. In some examples, such processes are performed by one or more computer systems, such as those described herein, which may include one or more computer systems of or connected to a replication environment, for instance one or more computers of a target system thereof, one or more cloud servers, and/or one or more other computer systems.

Referring initially to FIG. 18A, the process receives (1802), by a target system of a replication environment, compare records from a source system of the replication environment. A source datastore of the source system is in a replication relationship with a target datastore of the target system, in which changes to the source datastore are replicated to the target system for application to the target datastore. The received compare records correspond to selected source objects of the source datastore, which selected source objects could be all source objects in the source datastore or could be a subset thereof. The compare records are received in one or more compare transactions (e.g. UORs) to be performed by the target system for determining whether data of the target datastore is consistent with the selected source objects. The process then commences (1804) compare processing to perform the one or more compare transactions by an apply process of the target system.

Aspects of processing a compare record are described with reference to the process of FIG. 18B. The process of FIG. 18B includes identifying (1810) a selected source object identified by the compare record, attempting to locate and read (1812) a corresponding target object of the target datastore, and then further processing (1814) the compare record based on the result of that attempt, i.e. whether the corresponding target object is located and read by the attempting.

A database record's verification could involve multiple related segments or sub-objects. Thus, the selected source object could be a first source segment of a collection of related source segments/objects of a source data record of the source datastore. The compare record being processed could correspond to the first source segment, in which the compare record is a first compare record of a plurality of ordered compare records forming a compare transaction to be performed by the target. The plurality of ordered compare records are ordered according to an order of the collection of related segments of that source data record of the source datastore.

In one situation, the attempt to locate and read locates a target segment, of a target data record of the target datastore, corresponding to the first source segment. The further processing that compare record could include comparing the target segment to the first source segment and identifying that they are consistent. In that case, the compare processing (e.g. 1804) could proceed by iterating, one or more times, processing a next compare record (again in accordance with FIG. 18B). Thus, the process could identify (1810 of FIG. 18B) the source object identified by a sequentially-next compare record, read a next segment of the target datastore (i.e. in an attempt to find a corresponding target object (1812 of FIG. 18B), and then continue with processing the sequentially-next compare record (1814 of FIG. 18B).

FIG. 18C depicts one example of such further processing. The process compares (1820) the next segment/object of the target datastore to a sequentially-next compare record of the plurality of ordered compare records forming the compare transaction, and determines (1822), based on the comparing, whether an inconsistency exists between the next segment of the target datastore and a source segment, of the source datastore, identified by the sequentially-next compare record. If they are not inconsistent (1822, N), then the process proceeds to 1824 to process the next compare record.

If instead it was determined at 1822 that they are inconsistent (1822, Y), then based on this, the process identifies (1826) which of the source of target are missing data, i.e. by determining, based on information retrieved from the sequentially-next compare record and information retrieved from the next segment of the target datastore, either (i) that the next segment of the target datastore is not present in the source datastore, (ii) that the source segment identified by the sequentially-next compare record is not present in the target datastore, or (iii) that the source segment identified by the sequentially-next compare record and the next segment of the target datastore correspond to each other but that their segment data does not match.

The process proceeds by calling (1828) a conflict exit. The conflict can perform, as examples:
 (i) ignoring the inconsistency but continuing the compare processing to perform the one or more compare transactions;
 (ii) stopping source-to-target data replication for a data subscription to which the inconsistency applies;
 (iii) breaking from processing the compare transaction, and continuing to a next compare transaction, of the one or more compare transactions, if such a next compare transaction exists;
 (iv) breaking from processing the compare transaction, and replacing at least some data of the target data record with source data received in a compare record of the plurality of ordered compare records forming the compare transaction;
 (v) continuing processing the compare transaction and, based on completing processing the compare transaction, replacing at least some data of the target data record with source data received in a compare record of the plurality of ordered compare records forming the compare transaction; and/or
 (vi) synchronizing the inconsistency at the target datastore, and continuing processing the compare transaction.

The synchronizing (vi) could include, as examples, (a) based on the next segment of the target datastore not matching the source segment identified by the sequentially-next compare record, updating the next segment of the target datastore with an image of segment data from the sequentially-next compare record; (b) based on the source segment identified by the sequentially-next compare record not being present in the target datastore, inserting into the target data record a data segment corresponding to the source segment identified by the sequentially-next compare record; or (c) based on the next segment of the target datastore not being present in the source datastore, deleting the next segment of the target datastore.

Additionally or alternatively, based on detecting an inconsistency, the compare processing could determine the compare transaction as being 'not applied', and return the compare transaction to a work queue of the source system as an available dependency and flagged to indicate that the compare transaction is to be treated as a replace transaction by subsequent processing to effect replacement of data in the target data record with data of the source data record.

As another possibility, the attempt to find a root object in the target might fail. The attempting to locate and read (1812) fails to locate, in the target datastore, a target segment corresponding to the first (root) source segment, and, based on this, further processing the compare record can include the apply process converting the compare transaction into one or more insert operations to insert the source data record into the target datastore.

Additionally or alternatively, the source data record can include one or more pointers, each pointer of the one or more pointers pointing from a respective source element of the source data record to a respective target element of the source data record. The compare transaction can include, for each such pointer of the one or more pointers, a respective compare record placed immediately following a compare record for the source element from which the pointer points. The apply process can verify whether a target data record of the target datastore corresponding to the source data record includes a corresponding one or more pointers consistent with the one or more pointers of the source data record.

In some embodiments, key-based comparing is provided. Each compare record of the received compare records can include a respective key of a respective source object, of the source datastore, to which that compare record corresponds. The compare transactions(s) can form a key-based comparison operation to compare source objects of the source datastore to target objects of the target datastore. When processing a compare record of a compare transaction of the one or more compare transactions, processing that compare record can include obtaining from the compare record the key of that selected source object, retrieving from the target datastore a key of a next target object of the target datastore, comparing the key of the next target object of the target datastore to the key of the selected source object, and determining, based on the comparing, whether the key of the next target object of the target datastore matches the key of the selected source object.

Based on determining that the key of the next target object does not match the key of the selected source object, the processing the compare record can further include: (i) based on the key of the next target object being logically smaller than the key of the selected source object, determining that at least one target object exists in the target datastore that does not exist in the source datastore, or (ii) based on the key of the next target object being logically larger than the key of the selected source object, determining that at least one source object exists in the source datastore that does not exist in the target datastore.

Alternatively, based on determining that the key of the next target object matches the key of the selected source object, the compare processing can further include iterating, one or more times: identifying a sequentially-next compare record of the compare transaction, and repeating, for the sequentially-next compare record, the processing a compare record to process the sequentially-next compare record and determine whether a key of the source object of the source datastore to which that sequentially-next compare record corresponds matches a key of a next target object of the target datastore. This can be done iteratively until the last compare record has been processed. Thus, at each such iteration it can be determined whether an identified sequentially-next compare record indicates that the identified sequentially-next compare record is a final compare record for the key-based comparison operation. If so, the iterating can halts and the compare processing can issue a final request to retrieve a next target object of the target datastore, determining whether the final request returns an indication that there are no next target objects of the target datastore, and if the final request returns an indication that there are no next target objects of the target datastore, determine that the source objects of the source data are consistent with the target objects of the target datastore.

As an enhancement, each compare record of the received compare records can include a hash value of source data of the source object, of the source datastore, to which that compare record corresponds. In this case, process each compare record can further include obtaining a hash value of target data of the next target object of the database, comparing the hash value of the source data of the source object to the hash value of the target data of the next target object, and determining, based on the comparing the hash value of the source data of the source object to the hash value of the target data of the next target object, whether the hash value of the source data of the source object matches the hash value of the target data of the next target object. If not, the process can indicate to the source system that the source object differs from the target object.

Although various examples are provided, variations are possible without departing from a spirit of the claimed aspects.

Figure 19:
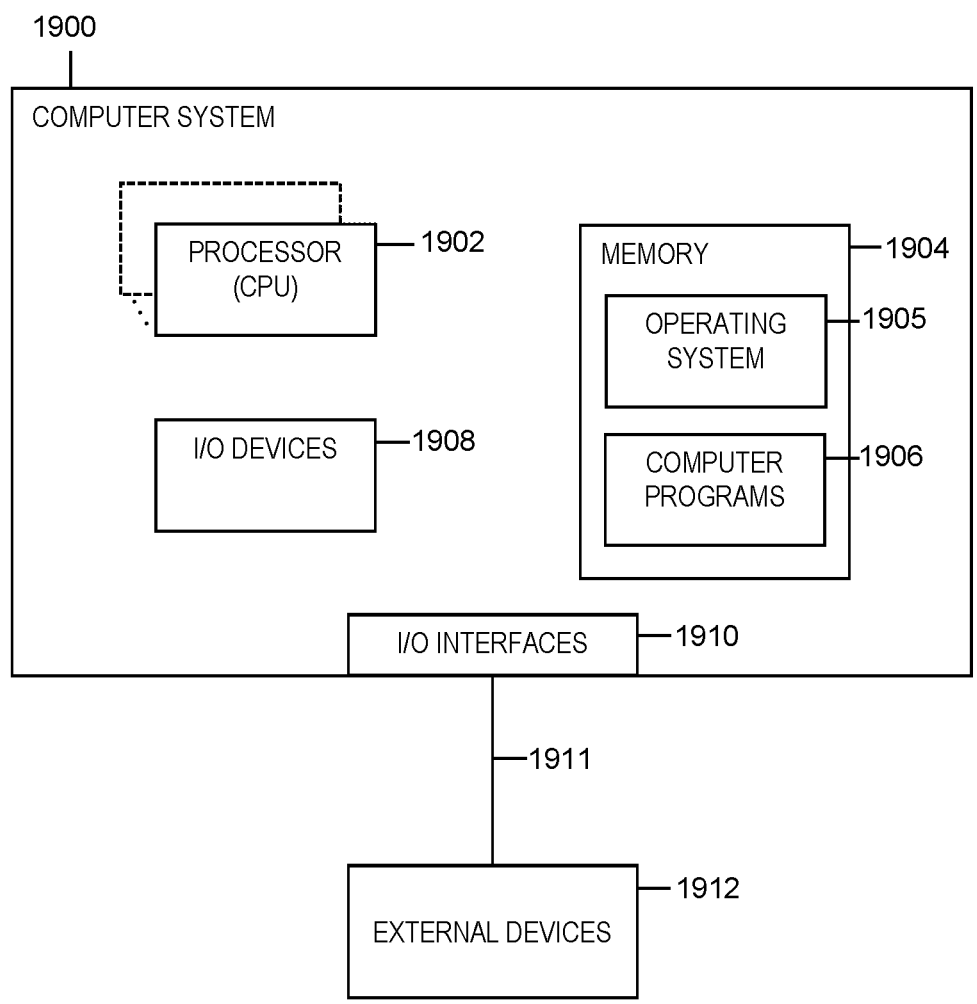
FIG. 19 depicts one example of a computer system and associated devices to incorporate and/or use aspects described herein.

Processes described herein may be performed singly or collectively by one or more computer systems. FIG. 19 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 19 shows a computer system 1900 in communication with external device(s) 1912. Computer system 1900 includes one or more processor(s) 1902, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1902 can also include register(s) to be used by one or more of the functional components. Computer system 1900 also includes memory 1904, input/output (I/O) devices 1908, and I/O interfaces 1910, which may be coupled to processor(s) 1902 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1904 can be or include main or system memory (e.g. Random Access Memory) used in the execution of program instructions, storage device(s) such as hard drive(s), flash media, or optical media as examples, and/or cache memory, as examples. Memory 1904 can include, for instance, a cache, such as a shared cache, which may be coupled to local caches (examples include L1 cache, L2 cache, etc.) of processor(s) 1902. Additionally, memory 1904 may be or include at least one computer program product having a set (e.g., at least one) of program modules, instructions, code or the like that is/are configured to carry out functions of embodiments described herein when executed by one or more processors.

Memory 1904 can store an operating system 1905 and other computer programs 1906, such as one or more computer programs/applications that execute to perform aspects described herein. Specifically, programs/applications can include computer readable program instructions that may be configured to carry out functions of embodiments of aspects described herein.

Examples of I/O devices 1908 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1912) coupled to the computer system through one or more I/O interfaces 1910.

Computer system 1900 may communicate with one or more external devices 1912 via one or more I/O interfaces 1910. Example external devices include a keyboard, a pointing device, a display, and/or any other devices that enable a user to interact with computer system 1900. Other example external devices include any device that enables computer system 1900 to communicate with one or more other computing systems or peripheral devices such as a printer. A network interface/adapter is an example I/O interface that enables computer system 1900 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 1910 and external devices 1912 can occur across wired and/or wireless communications link(s) 1911, such as Ethernet-based wired or wireless connections. Example wireless connections include cellular, Wi-Fi, Bluetooth®, proximity-based, near-field, or other types of wireless connections. More generally, communications link(s) 1911 may be any appropriate wireless and/or wired communication link(s) for communicating data.

Particular external device(s) 1912 may include one or more data storage devices, which may store one or more programs, one or more computer readable program instructions, and/or data, etc. Computer system 1900 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1900 may be operational with numerous other general purpose or special purpose computing system environments or configurations. Computer system 1900 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 20:
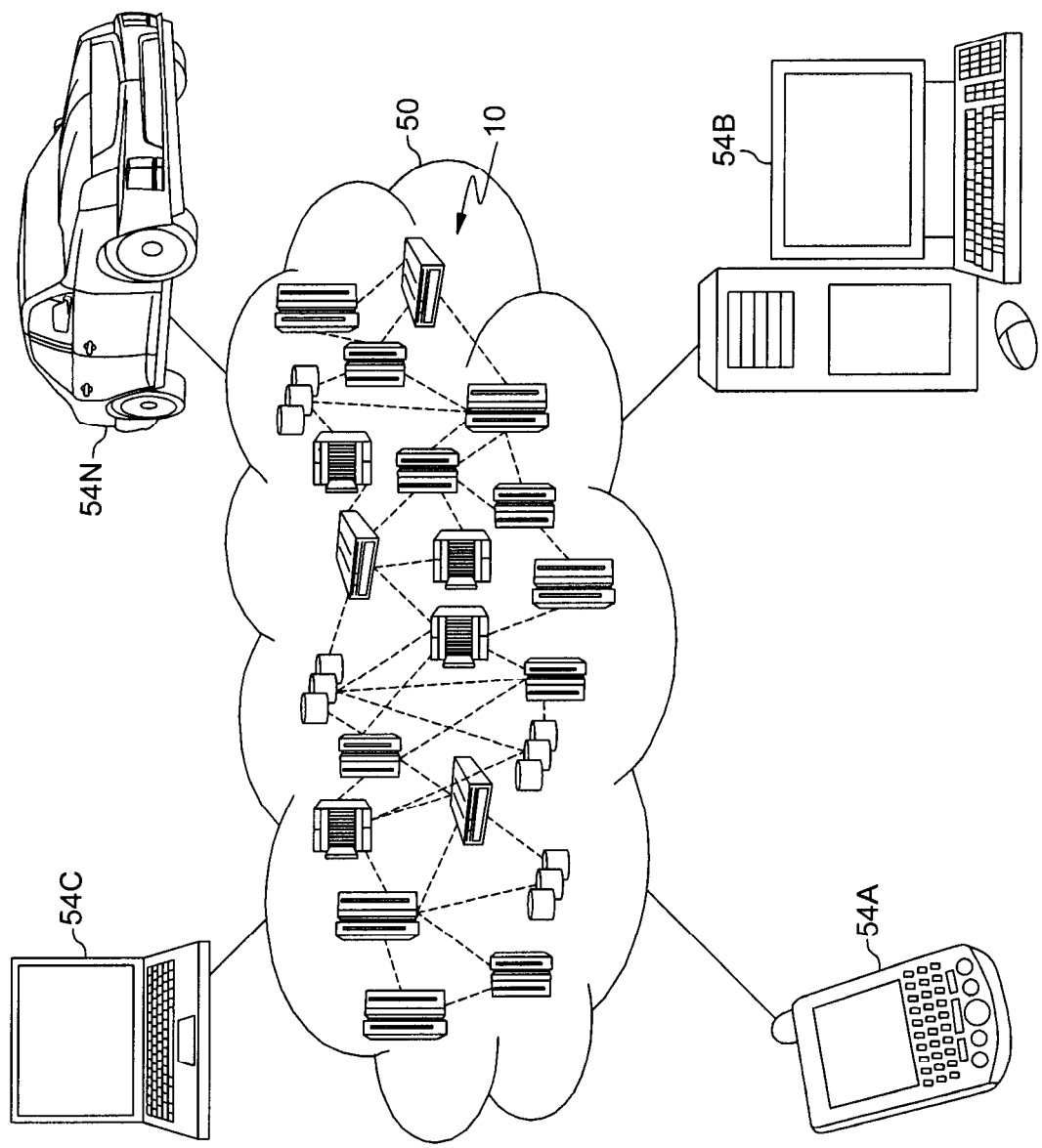
FIG. 20 depicts a cloud computing environment according to an embodiment of the present invention.

Referring now to FIG. 20, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 20 are intended to be illustrative only and that computing nodes 10 and cloud computing environment 50 can communicate with any type of computerized device over any type of network and/or network addressable connection (e.g., using a web browser).

Figure 21:
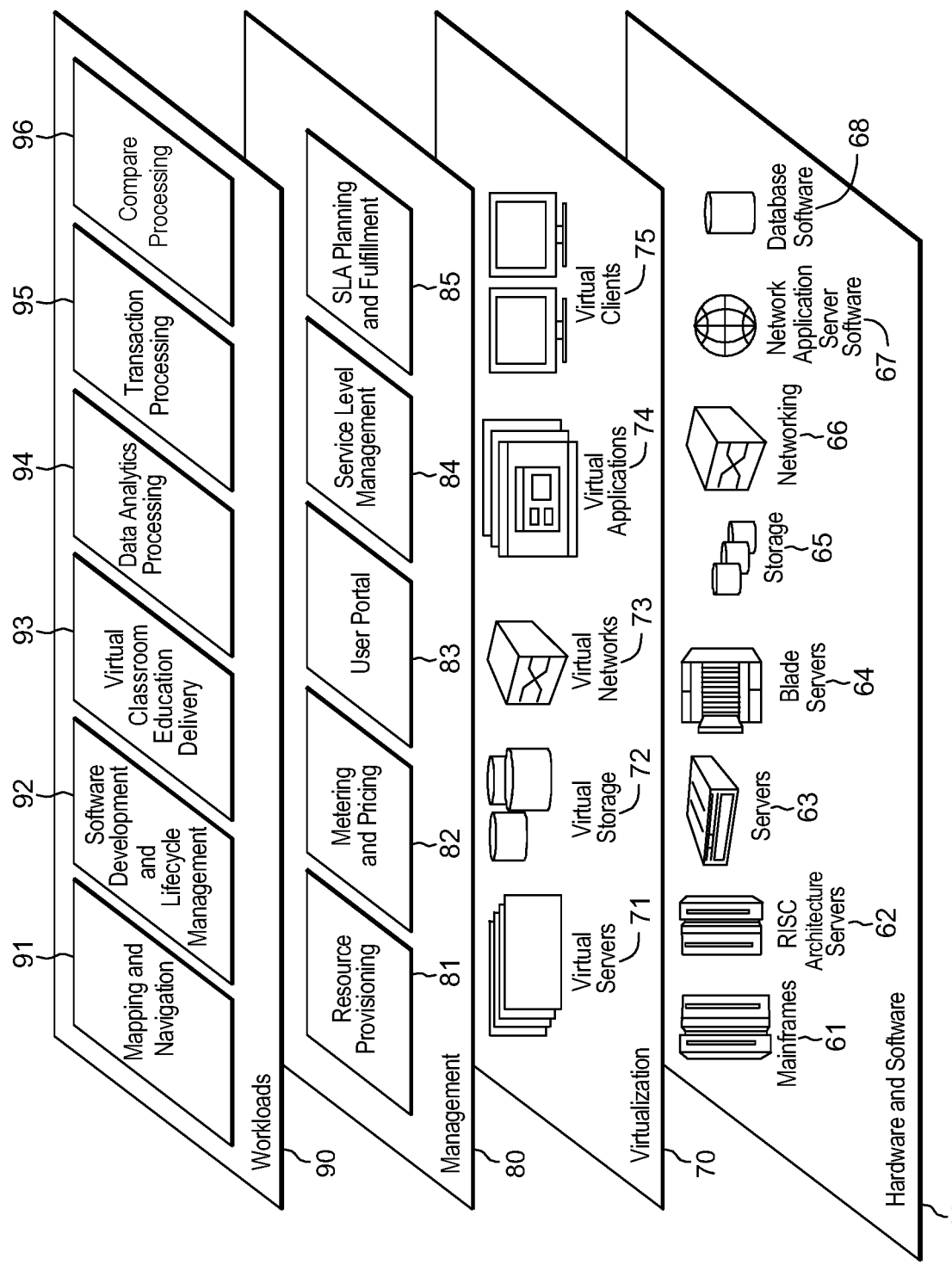
FIG. 21 depicts abstraction model layers according to an embodiment of the present invention.

Referring now to FIG. 21, a set of functional abstraction layers provided by cloud computing environment 50 (FIG. 20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compare processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

receiving, by a target system of a replication environment, compare records from a souse system of the replication environment, wherein a source datastore of the source system is in a replication relationship with a target datastore of the target system, in which changes to the source datastore are replicated to the target system for application to the target datastore, wherein each compare record of the compare records corresponds to a respective source object, of the source datastore, having source data therein, and the compare record is built by reading the source data of the respective source object of the source database and including in the compare record the read source data of the respective source object, wherein the source data read from a plurality of source objects for which a plurality of the compare records are built is the same as data already stored in corresponding target objects of the target datastore, wherein the compare records are received in one or more compare transactions to be performed by the target system for determining, for each compare record of the compare records, whether data applied to the target datastore is consistent with the source data, as provided in the compare record, of the respective source object; and commencing compare processing to perform the one or more compare transactions by an apply process of the target system, wherein the compare processing comprises:

processing a compare record of the received compare records, the processing the compare record comprising:

identifying a selected source object identified by the compare record;

attempting to locate and read a corresponding target object of the target datastore and obtain target data therefrom; and further processing the compare record based on whether the corresponding target object is located and read by the attempting; and processing each of the received compare records, wherein processing each of the received compare records identifies target objects existing in the target datastore that were not indicated by the received compare records as existing in the source datastore; and providing to the source system an indication of the identified target objects existing in the target datastore that were not indicated by the received compare records, to facilitate a review and determination by the source system of which, if any, of the identified target objects do not exist in the source datastore and are to be deleted at the target;

based on the review and determination by the source system, receiving, from the source system, in response to providing the indication, and in the form of one or more logged records to be processed by the apply process, indications of which target objects, of the identified target objects existing in the target datastore, are to be deleted at the target; and deleting from the target datastore the target objects that are to be deleted.

2. The method of claim 1, wherein the selected source object is a first source segment of a collection of related source segments of a source data record of the source datastore, the first source segment comprising source data, and the compare record corresponds to the first source segment and includes the source data of the first source segment, wherein the compare record is a first compare record of a plurality of ordered compare records forming a compare transaction of the one or more compare transactions to be performed by the target, the plurality of ordered compare records being ordered according to an order of the collection of related segments of that source data record of the source datastore.

3. The method of claim 2, wherein the attempting to locate and read locates a target segment, of a target data record of the target datastore, corresponding to the first source segment and reads target data from the target segment of the target data record, wherein the further processing the compare record comprises comparing the read target data of the target segment to the source data, of the first source segment, as provided in the compare record, and identifying that they are consistent, and wherein the compare processing further comprises iterating, one or more times:

reading next target data from a next segment of the target datastore;

comparing the next target data of the next segment of the target datastore to source data provided in a sequentially-next compare record of the plurality of ordered compare records forming the compare transaction; and determining, based on the comparing, whether an inconsistency exists between the next segment of the target datastore and a source segment, of the source datastore, identified by the sequentially-next compare record, based on the comparing the next target data of the next segment to the source data in the sequentially-next compare record.

4. The method of claim 3, wherein, based on determining that the inconsistency exists, the compare processing further comprises determining, based on information retrieved from the sequentially-next compare record and information retrieved from the next segment of the target datastore, one selected from the group consisting of: (i) that the next segment of the target datastore is not present in the source datastore, (ii) that the source segment identified by the sequentially-next compare record is not present in the target datastore, and (iii) that the source segment identified by the sequentially-next compare record and the next segment of the target datastore correspond to each other but that their segment data does not match.

5. The method of claim 4, wherein the compare processing further comprises calling a conflict exit that performs one selected from the group consisting of:

(i) ignoring the inconsistency but continuing the compare processing to perform the one or more compare transactions;

(ii) stopping source-to-target data replication for a data subscription to which the inconsistency applies;

(iii) breaking from processing the compare transaction, and continuing to a next compare transaction, of the one or more compare transactions, if such a next compare transaction exists;

(iv) breaking from processing the compare transaction, and replacing at least some data of the target data record with source data received in a compare record of the plurality of ordered compare records forming the compare transaction;

(v) continuing processing the compare transaction and, based on completing processing the compare transaction, replacing at least some data of the target data record with source data received in a compare record of the plurality of ordered compare records forming the compare transaction; and (vi) synchronizing the inconsistency at the target datastore, and continuing processing the compare transaction, the synchronizing comprising one selected from the group consisting of:

(a) based on the next segment of the target datastore not matching the source segment identified by the sequentially-next compare record, updating the next segment of the target datastore with an image of segment data from the sequentially-next compare record;

(b) based on the source segment identified by the sequentially —next compare record not being present in the target datastore, inserting into the target data record a data segment corresponding to the source segment identified by the sequentially-next compare record; and (c) based on the next segment of the target datastore not being present in the source datastore, deleting the next segment of the target datastore.

6. The method of claim 4, wherein based on detecting the inconsistency, the compare processing determines the compare transaction as being not applied, and wherein the compare processing further comprises returning the compare transaction to a work queue of the source system as an available dependency and flagged to indicate that the compare transaction is to be treated as a replace transaction by subsequent processing to effect replacement of data in the target data record with data of the source data record.

7. The method of claim 2, wherein the attempting to locate and read fails to locate, in the target datastore, a target segment corresponding to the first source segment, and wherein, based on the failing to locate, the further processing the compare record comprises the apply process converting the compare transaction into one or more insert operations to insert the source data record into the target datastore.

8. The method of claim 2, wherein the source data record comprises one or more pointers, each pointer of the one or more pointers pointing from a respective source element of the source data record to a respective target element of the source data record, wherein the compare transaction comprises, for each pointer of the one or more pointers, a respective compare record placed following a compare record for the source element from which the pointer points, and wherein the apply process verifies whether a target data record of the target datastore corresponding to the source data record comprises a corresponding one or more pointers consistent with the one or more pointers of the source data record.

9. The method of claim 1, wherein each compare record of the received compare records comprises a respective key of the respective source object, of the source datastore, to which that compare record corresponds, wherein the one or more compare transactions form a key-based comparison operation to compare source objects of the source datastore to target objects of the target datastore, wherein the compare record is a compare record of a compare transaction of the one or more compare transactions, and wherein the processing the compare record further comprises:

obtaining from the compare record the key of that selected source object;

retrieving from the target datastore a key of a next target object of the target datastore;

comparing the key of the next target object of the target datastore to the key of the selected source object; and determining, based on the comparing, whether the key of the next target object of the target datastore matches the key of the selected source object.

10. The method of claim 9, wherein based on determining that the key of the next target object does not match the key of the selected source object, the processing the compare record further comprises one selected from the group consisting of:

based on the key of the next target object being logically smaller than the key of the selected source object, determining that at least one target object exists in the target datastore that does not exist in the source datastore; and based on the key of the next target object being logically larger than the key of the selected source object, determining that at least one source object exists in the source datastore that does not exist in the target datastore.

11. The method of claim 9, wherein based on determining that the key of the next target object matches the key of the selected source object, the compare processing further comprises iterating, one or more times:

identifying a sequentially-next compare record of the compare transaction; and repeating, for the sequentially-next compare record, the processing a compare record to process the sequentially-next compare record and determine whether a key of the source object of the source datastore to which that sequentially-next compare record corresponds matches a key of a next target object of the target datastore.

12. The method of claim 11, wherein the iterating further comprises determining whether an identified sequentially-next compare record indicates that the identified sequentially —next compare record is a final compare record for the key-based comparison operation, wherein based on determining that the identified sequentially-next compare record indicates that the identified sequentially-next compare record is the final compare record for the key-based comparison operation, the iterating halts and the compare processing further comprises:

issuing a final request to retrieve a next target object of the target datastore;

determining whether the final request returns an indication that there are no next target objects of the target datastore; and based on the final request returning an indication that there are no next target objects of the target datastore, determining that the source objects of the source data are consistent with the target objects of the target datastore.

13. The method of claim 1, wherein the reading the source data of the respective source object of the source database in building the compare record reads the source object under lock.

14. A computer system comprising:
a memory; and
a processor in communication with the memory, wherein the computer system is configured to perform a method comprising:
receiving, by a target system of a replication environment, compare records from a source system of the replication environment, wherein a source datastore of the source system is in a replication relationship with a target datastore of the target system, in which changes to the source datastore are replicated to the target system for application to the target datastore, wherein each compare record of the compare records corresponds to a respective source object, of the source datastore, having source data therein, and the compare record is built by reading the source data of the respective source object of the source database and including in the compare record the read source data of the respective source object, wherein the source data read from a plurality of source objects for which a plurality of the compare records are built is the same as data already stored in corresponding target objects of the target datastore, and wherein the compare records are received in one or more compare transactions to be performed by the target system for determining, for each compare record of the compare records, whether data of the target datastore is consistent with the source data, as provided in the compare record, of the respective source object; and commencing compare processing to perform the one or more compare transactions by an apply process of the target system, wherein the compare processing comprises:
    processing a compare record of the received compare records, the processing the compare record comprising:
        identifying a selected source object identified by the compare record;
        attempting to locate and read a corresponding target object of the target datastore and obtain target data therefrom; and
        further processing the compare record based on whether the corresponding target object is located and read by the attempting; and
    processing each of the received compare records, wherein processing each of the received compare records identifies target objects existing in the target datastore that were not indicated by the received compare records as existing in the source datastore; and providing to the source system an indication of the identified target objects existing in the target datastore that were not indicated by the received compare records, to facilitate a review and determination by the source system of which, if any, of the identified target objects do not exist in the source datastore and are to be deleted at the target;

based on the review and determination by the source system, receiving, from the source system, in response to providing the indication, and in the form of one or more logged records to be processed by the apply process, indications of which target objects, of the identified target objects existing in the target datastore, are to be deleted at the target; and deleting from the target datastore the target objects that are to be deleted.

15. The computer system of claim 14, wherein the selected source object is a first source segment of a collection of related source segments of a source data record of the source datastore, the first source segment comprising source data, and the compare record corresponds to the first source segment and includes the source data of the first source segment,' wherein the compare record is a first compare record of a plurality of ordered compare records forming a compare transaction of the one or more compare transactions to be performed by the target, the plurality of ordered compare records being ordered according to an order of the collection of related segments of that source data record of the source datastore.

16. The computer system of claim 14, wherein each compare record of the received compare records comprises a respective key of the respective source object, of the source datastore, to which that compare record corresponds, wherein the one or more compare transactions form a key-based comparison operation to compare source objects of the source datastore to target objects of the target datastore, wherein the compare record is a compare record of a compare transaction of the one or more compare transactions, and wherein the processing the compare record further comprises:
    obtaining from the compare record the key of that selected source object;
    retrieving from the target datastore a key of a next target object of the target datastore;
    comparing the key of the next target object of the target datastore to the key of the selected source object; and
    determining, based on the comparing, whether the key of the next target object of the target datastore matches the key of the selected source object.

17. A computer program product comprising:
a computer readable storage medium readable by a processing circuit and storing instructions for execution by the processing circuit for performing a method comprising:
    receiving, by a target system of a replication environment, compare records from a source system of the replication environment, wherein a source datastore of the source system is in a replication relationship with a target datastore of the target system, in which changes to the source datastore are replicated to the target system for application to the target datastore, wherein each compare record of the compare records corresponds to a respective source object, of the source datastore, having source data therein, and the compare record is built by reading the source data of the respective source object of the source database and including in the compare record the read source data of the respective source object, wherein the source data read from a plurality of source objects for which a plurality of the compare records are built is the same as data already stored in corresponding target objects of the target datastore, and wherein the compare records are received in one or more compare transactions to be performed by the target system for determining, for each compare record of the compare records, whether data of the target datastore is consistent with the source data, as provided in the compare record, of the respective source object; and
    commencing compare processing to perform the one or more compare transactions by an apply process of the target system, wherein the compare processing comprises:
        processing a compare record of the received compare records, the processing the compare record comprising:
            identifying a selected source object identified by the compare record;
            attempting to locate and read a corresponding target object of the target datastore and obtain target data therefrom; and further processing the compare record based on whether the corresponding target object is located and read by the attempting; and processing each of the received compare records, wherein processing each of the received compare records identifies target objects existing in the target datastore that were not indicated by the received compare records as existing in the source datastore; and providing to the source system an indication of the identified target objects existing in the target datastore that were not indicated by the received comp are records, to facilitate a review and determination by the source system of which, if any, of the identified target objects do not exist in the source datastore and are to be deleted at the target;

based on the review and determination by the source system, receiving, from the source system, in response to providing the indication, and in the form of one or more logged records to be processed by the apply process, indications of which target objects, of the identified target objects existing in the target datastore, are to be deleted at the target; and deleting from the target datastore the target objects that are to be deleted.

* * * * *